(12) United States Patent
Chaturvedi et al.

(10) Patent No.: US 10,355,882 B2
(45) Date of Patent: Jul. 16, 2019

(54) SYSTEM AND METHOD FOR PROVIDING UNIFIED COMMUNICATIONS AND COLLABORATION (UCC) CONNECTIVITY BETWEEN INCOMPATIBLE SYSTEMS

(71) Applicant: DAMAKA, INC., Richardson, TX (US)

(72) Inventors: Sivakumar R. Chaturvedi, Allen, TX (US); Satish Gundabathula, Irving, TX (US)

(73) Assignee: Damaka, Inc., Richardson, TX (US)

( * ) Notice: Subject to any disclaimer, the term of this patent is extended or adjusted under 35 U.S.C. 154(b) by 222 days.

(21) Appl. No.: 15/422,746

(22) Filed: Feb. 2, 2017

(65) Prior Publication Data

US 2017/0149587 A1     May 25, 2017

Related U.S. Application Data

(63) Continuation of application No. PCT/US2015/043630, filed on Aug. 4, 2015.
(Continued)

(51) Int. Cl.
*H04L 12/66* (2006.01)
*G06F 13/38* (2006.01)
*H04L 29/08* (2006.01)

(52) U.S. Cl.
CPC ............ *H04L 12/66* (2013.01); *G06F 13/387* (2013.01); *H04L 67/141* (2013.01)

(58) Field of Classification Search
CPC ...... H04L 12/66; H04L 67/141; G06F 13/387
See application file for complete search history.

(56) References Cited

U.S. PATENT DOCUMENTS 5,442,637 A    8/1995   Nguyen
5,761,309 A    6/1998   Ohashi et al.
(Continued)

FOREIGN PATENT DOCUMENTS

EP     1404082 A2    3/2004
EP      160339 A1    12/2005
(Continued)

OTHER PUBLICATIONS

PCT: International Search Report and Written Opinion for PCT/US2011/024870; dated Oct. 26, 2011; 12 pages.
(Continued)

*Primary Examiner* — Ajay Cattungal

(57) ABSTRACT

An improved system and method are disclosed for enabling unified communications and collaboration (UCC) communications between incompatible communication systems. For example, the method may include using a universal UCC (U2C2) gateway in a first system to establish a connection with a server in a second system. The U2C2 gateway mimics a behavior defined for use within the second system when communicating with the server in order to be compatible with the second system. The U2C2 gateway notifies a multipoint control unit (MCU) within the first system of the connection. The MCU manages the UCC session and recognizes the U2C2 gateway as the source and destination for communications corresponding to the connection. The U2C2 gateway normalizes media received from the second system for compatibility with the first system before sending the media to the MCU for the UCC session. The U2C2 gateway also normalizes media received from the MCU for compatibility with the second system before sending the media to the second system.

18 Claims, 17 Drawing Sheets

Related U.S. Application Data

(60) Provisional application No. 62/033,439, filed on Aug. 5, 2014.

(56) References Cited

U.S. PATENT DOCUMENTS

| | | |
|---|---|---|
| 5,790,637 A | 8/1998 | Johnson et al. |
| 5,818,447 A | 10/1998 | Wolf et al. |
| 5,889,762 A | 3/1999 | Pajuvirta et al. |
| 6,031,818 A | 2/2000 | Lo et al. |
| 6,128,283 A | 10/2000 | Sabaa et al. |
| 6,141,687 A | 10/2000 | Blair |
| 6,161,082 A | 12/2000 | Goldberg et al. |
| 6,195,694 B1 | 2/2001 | Chen et al. |
| 6,202,084 B1 | 3/2001 | Kumar et al. |
| 6,219,638 B1 | 4/2001 | Padmanabhan et al. |
| 6,298,129 B1 | 10/2001 | Culver et al. |
| 6,311,150 B1 | 10/2001 | Ramaswamy et al. |
| 6,343,067 B1 | 1/2002 | Drottar et al. |
| 6,360,196 B1 | 3/2002 | Poznaski et al. |
| 6,389,016 B1 | 5/2002 | Sabaa et al. |
| 6,438,376 B1 | 8/2002 | Elliott et al. |
| 6,473,425 B1 | 10/2002 | Bellaton et al. |
| 6,574,668 B1 | 6/2003 | Gubbi et al. |
| 6,606,112 B1 * | 8/2003 | Falco .................. H04N 7/152 348/14.09 |
| 6,741,691 B1 | 5/2004 | Ritter et al. |
| 6,754,181 B1 | 6/2004 | Elliott et al. |
| 6,766,373 B1 | 7/2004 | Beadle |
| 6,826,613 B1 | 11/2004 | Wang et al. |
| 6,836,765 B1 | 12/2004 | Sussman |
| 6,842,460 B1 | 1/2005 | Olkkonen et al. |
| 6,850,769 B2 | 2/2005 | Grob et al. |
| 6,898,413 B2 | 5/2005 | Yip et al. |
| 6,912,278 B1 | 6/2005 | Hamilton |
| 6,940,826 B1 | 9/2005 | Simard et al. |
| 6,963,555 B1 | 11/2005 | Brenner et al. |
| 6,975,718 B1 | 12/2005 | Pearce et al. |
| 6,987,756 B1 | 1/2006 | Ravindranath et al. |
| 6,999,575 B1 | 2/2006 | Sheinbein |
| 6,999,932 B1 | 2/2006 | Zhou |
| 7,006,508 B2 | 2/2006 | Bondy et al. |
| 7,010,109 B2 | 3/2006 | Gritzer et al. |
| 7,013,155 B1 | 3/2006 | Ruf et al. |
| 7,079,529 B1 | 7/2006 | Khuc |
| 7,080,158 B1 | 7/2006 | Squire |
| 7,092,385 B2 | 8/2006 | Gallant et al. |
| 7,117,526 B1 | 10/2006 | Short |
| 7,123,710 B2 | 10/2006 | Ravishankar |
| 7,184,415 B2 | 2/2007 | Chaney et al. |
| 7,185,114 B1 | 2/2007 | Hariharasubrahmanian |
| 7,272,377 B2 | 9/2007 | Cox et al. |
| 7,302,496 B1 | 11/2007 | Metzger |
| 7,304,985 B2 | 12/2007 | Sojka et al. |
| 7,345,999 B2 | 3/2008 | Su et al. |
| 7,346,044 B1 | 3/2008 | Chou et al. |
| 7,353,252 B1 | 4/2008 | Yang et al. |
| 7,353,255 B2 | 4/2008 | Acharya et al. |
| 7,412,374 B1 | 8/2008 | Seiler et al. |
| 7,457,279 B1 | 11/2008 | Scott et al. |
| 7,477,282 B2 | 1/2009 | Firestone et al. |
| 7,487,248 B2 | 2/2009 | Moran et al. |
| 7,512,652 B1 | 3/2009 | Appelman et al. |
| 7,542,472 B1 | 6/2009 | Gerendai et al. |
| 7,564,843 B2 | 7/2009 | Manjunatha et al. |
| 7,570,743 B2 | 8/2009 | Barclay et al. |
| 7,574,523 B2 | 8/2009 | Traversat et al. |
| 7,590,758 B2 | 9/2009 | Takeda et al. |
| 7,613,171 B2 | 11/2009 | Zehavi et al. |
| 7,623,476 B2 | 11/2009 | Ravikumar et al. |
| 7,623,516 B2 | 11/2009 | Chaturvedi et al. |
| 7,656,870 B2 | 2/2010 | Ravikumar et al. |
| 7,664,495 B1 | 2/2010 | Bonner et al. |
| 7,769,881 B2 | 8/2010 | Matsubara et al. |
| 7,774,495 B2 | 8/2010 | Pabla et al. |
| 7,778,187 B2 | 8/2010 | Chaturvedi et al. |
| 7,782,866 B1 | 8/2010 | Walsh et al. |
| 7,917,584 B2 | 3/2011 | Arthursson |
| 8,009,586 B2 | 8/2011 | Chaturvedi et al. |
| 8,065,418 B1 | 11/2011 | Abuan et al. |
| 8,200,796 B1 | 6/2012 | Margulis |
| 8,407,576 B1 | 3/2013 | Yin et al. |
| 2001/0050923 A1 | 12/2001 | Park et al. |
| 2002/0031212 A1 | 3/2002 | O'Neil et al. |
| 2002/0037000 A1 | 3/2002 | Park et al. |
| 2002/0038282 A1 | 3/2002 | Montgomery |
| 2002/0042769 A1 | 4/2002 | Gujral et al. |
| 2002/0062285 A1 | 5/2002 | Amann et al. |
| 2002/0064167 A1 | 5/2002 | Khan et al. |
| 2002/0080719 A1 | 6/2002 | Parkvall et al. |
| 2002/0087887 A1 | 7/2002 | Busam et al. |
| 2002/0097150 A1 | 7/2002 | Sandelman et al. |
| 2002/0120757 A1 | 8/2002 | Sutherland et al. |
| 2002/0124096 A1 | 9/2002 | Loguinov et al. |
| 2002/0143548 A1 | 10/2002 | Korall et al. |
| 2002/0150110 A1 | 10/2002 | Inbar et al. |
| 2002/0152325 A1 | 10/2002 | Elgebaly et al. |
| 2002/0156844 A1 | 10/2002 | Maehiro |
| 2002/0166053 A1 | 11/2002 | Wilson |
| 2002/0173303 A1 | 11/2002 | Shibutani |
| 2002/0176404 A1 | 11/2002 | Girard |
| 2002/0178087 A1 | 11/2002 | Henderson et al. |
| 2002/0184310 A1 | 12/2002 | Traversat et al. |
| 2003/0009565 A1 | 1/2003 | Arao |
| 2003/0031210 A1 | 2/2003 | Harris |
| 2003/0035441 A1 | 2/2003 | Cheng et al. |
| 2003/0043764 A1 | 3/2003 | Kim et al. |
| 2003/0044020 A1 | 3/2003 | Aboba et al. |
| 2003/0046056 A1 | 3/2003 | Godoy et al. |
| 2003/0046585 A1 | 3/2003 | Minnick |
| 2003/0061025 A1 | 3/2003 | Abir |
| 2003/0061481 A1 | 3/2003 | Levine et al. |
| 2003/0072485 A1 | 4/2003 | Guerin et al. |
| 2003/0076815 A1 | 4/2003 | Miller et al. |
| 2003/0078858 A1 | 4/2003 | Angelopoulos et al. |
| 2003/0088676 A1 | 5/2003 | Smith et al. |
| 2003/0105812 A1 | 6/2003 | Flowers, Jr. et al. |
| 2003/0110047 A1 | 6/2003 | Santosuosso |
| 2003/0115251 A1 | 6/2003 | Fredrickson et al. |
| 2003/0126213 A1 | 7/2003 | Betzler |
| 2003/0135569 A1 | 7/2003 | Khakoo et al. |
| 2003/0137939 A1 | 7/2003 | Dunning et al. |
| 2003/0158722 A1 | 8/2003 | Lord |
| 2003/0163525 A1 | 8/2003 | Hendriks et al. |
| 2003/0163697 A1 | 8/2003 | Pabla et al. |
| 2003/0172145 A1 | 9/2003 | Nguyen |
| 2003/0174707 A1 | 9/2003 | Grob et al. |
| 2003/0177186 A1 | 9/2003 | Goodman et al. |
| 2003/0177422 A1 | 9/2003 | Tararoukhine et al. |
| 2003/0187650 A1 | 10/2003 | Moore et al. |
| 2003/0202480 A1 | 10/2003 | Swami |
| 2003/0212772 A1 | 11/2003 | Harris |
| 2003/0214955 A1 | 11/2003 | Kim |
| 2003/0217171 A1 | 11/2003 | Von Stuermer et al. |
| 2003/0217318 A1 | 11/2003 | Choi |
| 2003/0220121 A1 | 11/2003 | Konishi et al. |
| 2003/0229715 A1 | 12/2003 | Baratakke et al. |
| 2004/0005877 A1 | 1/2004 | Vaananen |
| 2004/0024879 A1 | 2/2004 | Dingman et al. |
| 2004/0034776 A1 | 2/2004 | Fernando et al. |
| 2004/0034793 A1 | 2/2004 | Yuan |
| 2004/0039781 A1 | 2/2004 | Lavallee et al. |
| 2004/0044517 A1 | 3/2004 | Palmquist |
| 2004/0052234 A1 | 3/2004 | Ameigeiras et al. |
| 2004/0062267 A1 | 4/2004 | Minami et al. |
| 2004/0068567 A1 | 4/2004 | Moran et al. |
| 2004/0100973 A1 | 5/2004 | Prasad |
| 2004/0103212 A1 | 5/2004 | Takeuchi et al. |
| 2004/0128554 A1 | 7/2004 | Maher, III et al. |
| 2004/0133689 A1 | 7/2004 | Vasisht |
| 2004/0139225 A1 | 7/2004 | Takahashi |
| 2004/0139228 A1 | 7/2004 | Takeda et al. |
| 2004/0139230 A1 | 7/2004 | Kim |
| 2004/0143678 A1 | 7/2004 | Chari et al. |

(56) References Cited

U.S. PATENT DOCUMENTS

| | | |
|---|---|---|
| 2004/0148434 A1 | 7/2004 | Matsubara et al. |
| 2004/0153858 A1 | 8/2004 | Hwang |
| 2004/0158471 A1 | 8/2004 | Davis et al. |
| 2004/0162871 A1 | 8/2004 | Pabla et al. |
| 2004/0193599 A1 | 9/2004 | Liu et al. |
| 2004/0203834 A1 | 10/2004 | Mahany |
| 2004/0213184 A1 | 10/2004 | Hu et al. |
| 2004/0228279 A1 | 11/2004 | Midtun et al. |
| 2004/0240399 A1 | 12/2004 | Corrao et al. |
| 2004/0249885 A1 | 12/2004 | Petropoulakis et al. |
| 2004/0249953 A1 | 12/2004 | Fernandez et al. |
| 2004/0260952 A1 | 12/2004 | Newman et al. |
| 2004/0267527 A1 | 12/2004 | Creamer et al. |
| 2004/0267938 A1 | 12/2004 | Shoroff et al. |
| 2004/0268257 A1 | 12/2004 | Mudusuru |
| 2005/0004982 A1 | 1/2005 | Vernon et al. |
| 2005/0008024 A1 | 1/2005 | Newpol et al. |
| 2005/0015502 A1 | 1/2005 | Kang et al. |
| 2005/0033843 A1 | 2/2005 | Shahi et al. |
| 2005/0033985 A1 | 2/2005 | Xu et al. |
| 2005/0050227 A1 | 3/2005 | Michelman |
| 2005/0071481 A1 | 3/2005 | Danieli |
| 2005/0086309 A1 | 4/2005 | Galli et al. |
| 2005/0091407 A1 | 4/2005 | Vaziri et al. |
| 2005/0105524 A1 | 5/2005 | Stevens et al. |
| 2005/0119005 A1 | 6/2005 | Segal et al. |
| 2005/0120073 A1 | 6/2005 | Cho |
| 2005/0130650 A1 | 6/2005 | Creamer et al. |
| 2005/0132009 A1 | 6/2005 | Solie |
| 2005/0136911 A1 | 6/2005 | Csapo et al. |
| 2005/0138119 A1 | 6/2005 | Saridakis |
| 2005/0138128 A1 | 6/2005 | Baniel et al. |
| 2005/0143105 A1 | 6/2005 | Okamoto |
| 2005/0144288 A1 | 6/2005 | Liao |
| 2005/0187781 A1 | 8/2005 | Christensen |
| 2005/0187957 A1 | 8/2005 | Kramer et al. |
| 2005/0195802 A1 | 9/2005 | Klein et al. |
| 2005/0198499 A1 | 9/2005 | Salapaka et al. |
| 2005/0201357 A1 | 9/2005 | Poyhonen |
| 2005/0201485 A1 | 9/2005 | Fay |
| 2005/0208947 A1 | 9/2005 | Bahl |
| 2005/0220017 A1 | 10/2005 | Brand et al. |
| 2005/0246193 A1 | 11/2005 | Roever et al. |
| 2005/0249196 A1 | 11/2005 | Ansari et al. |
| 2005/0254440 A1 | 11/2005 | Sorrell |
| 2005/0270992 A1 | 12/2005 | Sanzgiri et al. |
| 2005/0286519 A1 | 12/2005 | Ravikumar et al. |
| 2006/0002355 A1 | 1/2006 | Baek et al. |
| 2006/0062180 A1 | 3/2006 | Sayeedi et al. |
| 2006/0069775 A1 | 3/2006 | Artobello et al. |
| 2006/0072506 A1 | 4/2006 | Sayeedi et al. |
| 2006/0120375 A1 | 6/2006 | Ravikumar et al. |
| 2006/0121902 A1 | 6/2006 | Jagadeesan et al. |
| 2006/0121986 A1 | 6/2006 | Pelkey et al. |
| 2006/0148516 A1 | 7/2006 | Reddy et al. |
| 2006/0165029 A1 | 7/2006 | Melpignano et al. |
| 2006/0168643 A1 | 7/2006 | Howard et al. |
| 2006/0171534 A1 | 8/2006 | Baughman |
| 2006/0182100 A1 | 8/2006 | Li et al. |
| 2006/0183476 A1 | 8/2006 | Morita et al. |
| 2006/0187926 A1 | 8/2006 | Imai |
| 2006/0195402 A1 | 8/2006 | Malina et al. |
| 2006/0203750 A1 | 9/2006 | Ravikumar et al. |
| 2006/0205436 A1 | 9/2006 | Liu et al. |
| 2006/0218624 A1 | 9/2006 | Ravikumar et al. |
| 2006/0230166 A1 | 10/2006 | Philyaw |
| 2006/0233117 A1 | 10/2006 | Tomsu et al. |
| 2006/0246903 A1 | 11/2006 | Kong et al. |
| 2006/0258289 A1 | 11/2006 | Dua |
| 2007/0016921 A1 | 1/2007 | Levi et al. |
| 2007/0019545 A1 | 1/2007 | Alt et al. |
| 2007/0025270 A1 | 2/2007 | Sylvain |
| 2007/0078785 A1 | 4/2007 | Bush et al. |
| 2007/0082671 A1 | 4/2007 | Feng et al. |
| 2007/0110043 A1 | 5/2007 | Girard |
| 2007/0111794 A1 | 5/2007 | Hogan et al. |
| 2007/0116224 A1 | 5/2007 | Burke et al. |
| 2007/0130253 A1 | 6/2007 | Newson et al. |
| 2007/0136459 A1 | 6/2007 | Roche et al. |
| 2007/0165629 A1 | 7/2007 | Chaturvedi et al. |
| 2007/0190987 A1 | 8/2007 | Vaananen |
| 2007/0206563 A1 | 9/2007 | Silver et al. |
| 2007/0239892 A1 | 10/2007 | Ott et al. |
| 2007/0253435 A1 | 11/2007 | Keller et al. |
| 2007/0260359 A1 | 11/2007 | Benson et al. |
| 2007/0274276 A1 | 11/2007 | Laroia et al. |
| 2007/0280253 A1 | 12/2007 | Rooholamini et al. |
| 2007/0294626 A1 | 12/2007 | Fletcher et al. |
| 2007/0297430 A1 | 12/2007 | Nykanen et al. |
| 2008/0005328 A1 | 1/2008 | Shively et al. |
| 2008/0019285 A1 | 1/2008 | John et al. |
| 2008/0032695 A1 | 2/2008 | Zhu et al. |
| 2008/0046984 A1 | 2/2008 | Bohmer et al. |
| 2008/0069105 A1 | 3/2008 | Costa et al. |
| 2008/0080392 A1 | 4/2008 | Walsh et al. |
| 2008/0091813 A1 | 4/2008 | Bodlaender |
| 2008/0123685 A1 | 5/2008 | Varma et al. |
| 2008/0130639 A1 | 6/2008 | Costa-Requena et al. |
| 2008/0168440 A1 | 7/2008 | Regnier et al. |
| 2008/0192756 A1 | 8/2008 | Damola et al. |
| 2008/0235362 A1 | 9/2008 | Kjesbu et al. |
| 2008/0235511 A1 | 9/2008 | O'Brien et al. |
| 2008/0244718 A1 | 10/2008 | Frost et al. |
| 2008/0250408 A1 | 10/2008 | Tsui et al. |
| 2008/0273541 A1 | 11/2008 | Pharn |
| 2008/0320096 A1 | 12/2008 | Szeto |
| 2008/0320565 A1 | 12/2008 | Buch et al. |
| 2009/0003322 A1 | 1/2009 | Isumi |
| 2009/0006076 A1 | 1/2009 | Jindal |
| 2009/0052399 A1 | 2/2009 | Silver et al. |
| 2009/0055473 A1 | 2/2009 | Synnergren |
| 2009/0088150 A1 | 4/2009 | Chaturvedi et al. |
| 2009/0136016 A1 | 5/2009 | Gornoi et al. |
| 2009/0156217 A1 | 6/2009 | Bajpai |
| 2009/0182815 A1 | 7/2009 | Czechowski et al. |
| 2009/0192976 A1 | 7/2009 | Spivack et al. |
| 2009/0234967 A1 | 9/2009 | Yu et al. |
| 2009/0240821 A1 | 9/2009 | Juncker et al. |
| 2009/0257433 A1 | 10/2009 | Mutikainen et al. |
| 2009/0300673 A1 | 12/2009 | Bachet et al. |
| 2009/0327516 A1 | 12/2009 | Amishima et al. |
| 2010/0011108 A1 | 1/2010 | Clark et al. |
| 2010/0011111 A1 | 1/2010 | Mohammad |
| 2010/0049980 A1 | 2/2010 | Barriga et al. |
| 2010/0058353 A1 | 3/2010 | Turski |
| 2010/0077023 A1 | 3/2010 | Eriksson |
| 2010/0107205 A1 | 4/2010 | Foti |
| 2010/0174783 A1 | 7/2010 | Zarom |
| 2010/0191954 A1 | 7/2010 | Kim et al. |
| 2010/0223047 A1 | 9/2010 | Christ |
| 2010/0279670 A1 | 11/2010 | Ghai et al. |
| 2010/0299150 A1 | 11/2010 | Fein et al. |
| 2010/0299313 A1 | 11/2010 | Orsini et al. |
| 2010/0312832 A1 | 12/2010 | Allen et al. |
| 2010/0312897 A1 | 12/2010 | Allen et al. |
| 2011/0040836 A1 | 2/2011 | Allen et al. |
| 2011/0099612 A1 | 4/2011 | Lee et al. |
| 2011/0122864 A1 | 5/2011 | Cherifi et al. |
| 2011/0141220 A1 | 6/2011 | Miura |
| 2011/0145687 A1 | 6/2011 | Grigsby et al. |
| 2011/0307556 A1 | 12/2011 | Chaturvedi et al. |
| 2011/0314134 A1 | 12/2011 | Foti |
| 2011/0320821 A1 | 12/2011 | Alkhatib et al. |
| 2012/0078609 A1 | 3/2012 | Chaturvedi et al. |
| 2012/0124191 A1 | 5/2012 | Lyon |
| 2012/0221952 A1* | 8/2012 | Chavez ............ G06Q 10/00 715/733 |
| 2012/0263144 A1 | 10/2012 | Nix |
| 2013/0067004 A1 | 3/2013 | Logue et al. |
| 2013/0106989 A1* | 5/2013 | Gage ............ H04N 7/152 348/14.09 |
| 2013/0111064 A1 | 5/2013 | Mani et al. |
| 2013/0125145 A1 | 5/2013 | Balmori Labra et al. |

(56) References Cited

U.S. PATENT DOCUMENTS

| | | | |
|---|---|---|---|
| 2013/0132285 A1* | 5/2013 | Richards | G06F 9/541 |
| | | | 705/300 |
| 2013/0232553 A1* | 9/2013 | Tomfohrde | G06F 21/10 |
| | | | 726/4 |
| 2013/0278635 A1* | 10/2013 | Maggiore | G06T 19/006 |
| | | | 345/633 |
| 2014/0156854 A1* | 6/2014 | Gaetano, Jr. | H04L 65/1069 |
| | | | 709/227 |
| 2014/0244708 A1* | 8/2014 | Taine | H04L 65/40 |
| | | | 709/201 |
| 2015/0026700 A1 | 1/2015 | Chaturvedi et al. | |
| 2015/0229487 A1* | 8/2015 | Lickliter | H04L 12/1827 |
| | | | 709/203 |
| 2015/0373546 A1* | 12/2015 | Haugen | H04W 12/08 |
| | | | 726/22 |
| 2016/0036962 A1* | 2/2016 | Rand | H04R 1/1041 |
| | | | 455/418 |
| 2016/0078382 A1* | 3/2016 | Watkins | G06Q 10/06315 |
| | | | 705/7.25 |
| 2017/0131691 A1* | 5/2017 | Cheung | G06F 9/451 |
| 2017/0237289 A1* | 8/2017 | Thompson | H02J 3/00 |
| | | | 700/296 |

FOREIGN PATENT DOCUMENTS

| | | |
|---|---|---|
| EP | 1638275 A2 | 3/2006 |
| EP | 1848163 A1 | 10/2007 |
| EP | 1988697 A1 | 11/2008 |
| EP | 1988698 A1 | 11/2008 |
| JP | 2005-94600 | 4/2005 |
| JP | 2007-043598 | 2/2007 |
| KR | 10-2005-0030548 | 3/2005 |
| WO | WO 2004/063843 | 7/2000 |
| WO | WO 2003/079635 | 9/2003 |
| WO | WO 2005/009019 | 1/2005 |
| WO | 2006064047 A1 | 6/2006 |
| WO | WO 2006/075677 | 7/2006 |
| WO | WO 2008099420 A2 | 8/2008 |

OTHER PUBLICATIONS

J. Rosenberg et al. "Session Traversal Utilities for NAT (STUN)", draft—ieff—behave—rfc3489bis-06, Mar. 5, 2007.
PCT: International Search Report and Written Opinion for PCT/US2011/028685; dated Nov. 9, 2011; 10 pages.
PCT: International Search Report and Written Opinion for PCT/US2011/029954; dated Nov. 24, 2011; 8 pages.
PCT: International Search Report and Written Opinion for PCT/US2011/024891; dated Nov. 25, 2011; 9 pages.
PCT: International Search Report and Written Opinion for PCT/US2011/031245; dated Dec. 26, 2011; 13 pages.
Wireless Application Protocol—Wireless Transport Layer Security Specification, Version Feb. 18, 2000, Wireless Application Forum, Ltd. 2000; 99 pages.
PCT: International Search Report and Written Opinion for PCT/US2011/040864; dated Feb. 17, 2012; 8 pages.
PCT: International Search Report and Written Opinion for PCT/US2011/041565; dated Jan. 5, 2012; 7 pages.
PCT: International Search Report and Written Opinion for PCT/US2011/031246; dated Dec. 27, 2011; 8 pages.
PCT: International Search Report and Written Opinion for PCT/US2011/049000; dated Mar. 27, 2012; 10 pages.
PCT: International Search Report and Written Opinion for PCT/US2011/051877; dated Apr. 13, 2012; 7 pages.
PCT: International Search Report and Written Opinion for PCT/US2011/055101; dated May 22, 2012; 9 pages.
Balamurugan Karpagavinayagam et al. (Monitoring Architecture for Lawful Interception in VoIP Networks, ICIMP 2007, (Aug. 24, 2008).
NiceLog User's Manual 385A0114-08 Rev. A2, Mar. 2004.

WISPA: Wireless Internet Service Providers Association; WISPA-CS-IPNA-2.0; May 1, 2009.
PCT: International Preliminary Report on Patentability of PCT/US2011/024870; dated Aug. 30, 2012; 7 pgs.
RFC 5694 ("Peer-to-Peer (P2P) Architecture: Definition, Taxonomies, Examples, and Applicability", Nov. 2009).
Mahy et al., The Session Initiation Protocol (SIP) "Replaces" Header, Sep. 2004, RFC 3891, pp. 1-16.
PCT: International Preliminary Report on Patentability of PCT/US2011/024891; dated Aug. 30, 2012; 6 pgs.
T. Dierks & E. Rescorla, The Transport Layer Security (TLS) Protocol (Ver. 1.2, Aug. 2008) retrieved at http://tools.ieff.org/htmllrfc5246. Relevant pages provided.
J. Rosenberg et al., SIP: Session Initiation Protocol (Jun. 2008) retrieved at http://tools.ietf.org/html/rfc3261. Relevant pages provided.
Philippe Bazot et al., Developing SIP and IP Multimedia Subsystem (IMS) Applications (Feb. 5, 2007) retrieved at redbooks IBM form No. SG24-7255-00. Relevant pages provided.
PCT: International Preliminary Report on Patentability of PCT/US2011/028685; dated Oct. 4, 2012; 6 pgs.
PCT: International Preliminary Report on Patentability of PCT/US2011/031245; dated Oct. 26, 2012; 9 pgs.
PCT: International Preliminary Report on Patentability of PCT/US2011/029954; dated Oct. 11, 2012; 5 pgs.
PCT: International Preliminary Report on Patentability of PCT/US2011/031246; dated Nov. 8, 2012; 5 pgs.
Rosenberg, J; "Interactive Connectivity Establishment (ICE): A Protocol for Network Address Translator (NAT) Traversal for Offer/Answer Protocols"; Oct. 29, 2007; I ETF; I ETF draft of RFC 5245, draft-ieff-mmusic-ice-19; pp. 1-120.
Blanchet et al; "IPv6 Tunnel Broker with the Tunnel Setup Protocol (TSP)"; May 6, 2008; IETF; IETF draft of RFC 5572, draftblanchet-v6ops-tunnelbroker-tsp-04; pp. 1-33.
Cooper et al; "NAT Traversal for dSIP"; Feb. 25, 2007; IETF; IETF draft draft-matthews-p2psip-dsip-nat-traversal-00; pp. 1-23.
Cooper et al; "The Effect of NATs on P2PSIP Overlay Architecture"; IETF; IETF draft draft-matthews-p2psip-nats-and-overlays-01.txt; pp. 1-20.
Srisuresh et al; "State of Peer-to-Peer(P2P) Communication Across Network Address Translators(NATs)"; Nov. 19, 2007; I ETF; I ETF draft for RFC 5128, draft-ietf-behave-p2p-state-06.txt; pp. 1-33.
PCT: International Search Report and Written Opinion for PCT/US2012/046026; dated Oct. 18, 2012; 6 pages.
Dunigan, Tom, "Almost TCP over UDP (atou)," last modified Jan. 12, 2004; retrieved on Jan. 18, 2011 from <http://www.csm.ornl.gov/~dunigan/net100/atou.html> 18 pgs.
PCT: International Preliminary Report on Patentability of PCT/US2011/040864; dated Jan. 3, 2013; 6 pgs.
PCT: International Preliminary Report on Patentability of PCT/US2011/041565; dated Jan. 10, 2013; 6 pgs.
PCT: International Preliminary Report on Patentability of PCT/US2011/049000; dated Feb. 26, 2013; 6 pgs.
PCT: International Preliminary Report on Patentability of PCT/US2011/051877; dated Mar. 26, 2013; 5 pgs.
PCT: International Preliminary Report on Patentability of PCT/US2011/055101; dated Apr. 16, 2013; 7 pgs.
PCT: International Preliminary Report on Patentability of PCT/US2012/046026; dated Jan. 30, 2014; 5 pgs.
PCT: International Preliminary Report on Patentability of PCT/US2008/075141; dated Mar. 9, 2010; 5 pgs.
PCT: International Preliminary Report on Patentability of PCT/US2007/068820; dated Dec. 31, 2008; 8 pgs.
PCT: International Preliminary Report on Patentability of PCT/US2007/068823; dated Nov. 27, 2008; 8 pgs.
PCT: International Preliminary Report on Patentability of PCT/US2006/047841; dated Nov. 6, 2008; 7 pgs.
PCT: International Preliminary Report on Patentability of PCT/US2007/002424; dated Aug. 7, 2008; 6 pgs.
PCT: International Preliminary Report on Patentability of PCT/US2006/040312; dated May 2, 2008; 5 pgs.
PCT: International Preliminary Report on Patentability of PCT/IB2005/000821; dated Oct. 19, 2006; 10 pgs.

(56) References Cited

OTHER PUBLICATIONS

Chathapuram, "Security in Peer-To-Peer Networks", Aug. 8. 2001, XP002251813.
International Search Report and Written Opinion of the International Searching Authority from PCT/IB2005/000821, dated Aug. 5, 2005.
International Search Report and Written Opinion of the International Searching Authority from PCT/US2006/032791, dated Dec. 18, 2006.
International Search Report and Written Opinion of the International Searching Authority from PCT/US2006/040312, dated Mar. 2, 2007.
International Search Report and Written Opinion of the International Searching Authority from PCT/US2006/047841, dated Sep. 12, 2008.
International Search Report and Written Opinion of the International Searching Authority from PCT/US2007/002424, dated Aug. 14, 2007.
International Search Report and Written Opinion of the International Searching Authority from PCT/US2007/068820, dated Jun. 11, 2008.
International Search Report and Written Opinion of the International Searching Authority from PCT/US2007/068821, dated Jun. 14, 2008.
International Search Report and Written Opinion of the International Searching Authority from PCT/US2007068823, dated Jun. 1, 2008.
Jeff Tyson, "How Instant Messaging Works", www.verizon.com/learningcenter, Mar. 9, 2005.
Rory Bland, et al,"P2P Routing" Mar. 2002.
Rosenberg, "STUN—Simple Traversal of UDP Through NAT", Sep. 2002, XP015005058.
Salman A. Baset, et al, "An Analysis of the Skype Peer-To-Peer Internet Telephony Protocol", Department of Computer Science, Columbia University, New York, NY, USA, Sep. 15, 2004.
Singh et al., "Peer-to Peer Internet Telephony Using SIP", Department of Computer Science, Columbia University, Oct. 31, 2004, XP-002336408.
Sinha, S. and Oglieski, A., A TCP Tutorial, Nov. 1998 (Date posted on Internet: Apr. 19, 2001) [Retrieved from the Internet <URL:http//www.ssfnet.org/Exchange/tcp/tcpTutorialNotes.html>].
Pejman Khadivi, Terence D. Todd and Dongmei Zhao, "Handoff trigger nodes for hybrid IEEE 802.11 WLAN/cellular networks," Proc. of IEEE International Conference on Quality of Service in Heterogeneous Wired/Wireless Networks, pp. 164-170, Oct. 18, 2004.
International Search Report and Written Opinion of the International Searching Authority from PCT/US2008/078142, dated Mar. 27, 2009.
International Search Report and Written Opinion of the International Searching Authority from PCT/US2008/084950, dated Apr. 27, 2009.
Hao Wang, Skype VoIP service-architecture and comparison, In: INFOTECH Seminar Advanced Communication Services (ASC), 2005, pp. 4, 7, 8.
Seta, N.; Miyajima, H.; Zhang, L;; Fujii, T., "All-SIP Mobility: Session Continuity on Handover in Heterogeneous Access Environment," Vehicular Technology Conference, 2007. VTC 2007-Spring. IEEE 65th, Apr. 22-25, 2007, pp. 1121-1126.
International Search Report and Written Opinion of the International Searching Authority from PCT/US2008/075141, dated Mar. 5, 2009.
Qian Zhang; Chuanxiong Guo; Zihua Guo; Wenwu Zhu, "Efficient mobility management for vertical handoff between WWAN and WLAN," Communications Magazine, IEEE, vol. 41. issue 11, Nov. 2003, pp. 102-108.
Isaacs, Ellen et al., "Hubbub: A sound-enhanced mobile instant messenger that supports awareness and opportunistic interactions," Proceedings of the SIGCHI Conference on Human Factors in Computing Systems; vol. 4, Issue No. 1; Minneapolis, Minnesota; Apr. 20-25, 2002; pp. 179-186.
PCT: International Preliminary Report on Patentability of PCT/US2008/084950; dated Jun. 1, 2010; 5 pgs.
International Search Report and Written Opinion of the International Searching Authority from PCT/US2014/039777, dated Sep. 30, 2014.
International Search Report and Written Opinion of the International Searching Authority from PCT/US2014/39782, dated Oct. 17, 2014.
International Search Report and Written Opinion of PCT/US2015/43633, dated Oct. 26, 2015, 21 pgs.
PCT: International Search Report and Written Opinion of PCT/US2015/43630 (related application), dated Oct. 30, 2005, 20 pgs.
PCT: International Preliminary Report on Patentability of PCT/US2014/039777; dated Jan. 28, 2016; 8 pgs.
PCT: International Preliminary Report on Patentability of PCT/US14/39782; dated Apr. 19, 2016; 9 pgs.

* cited by examiner

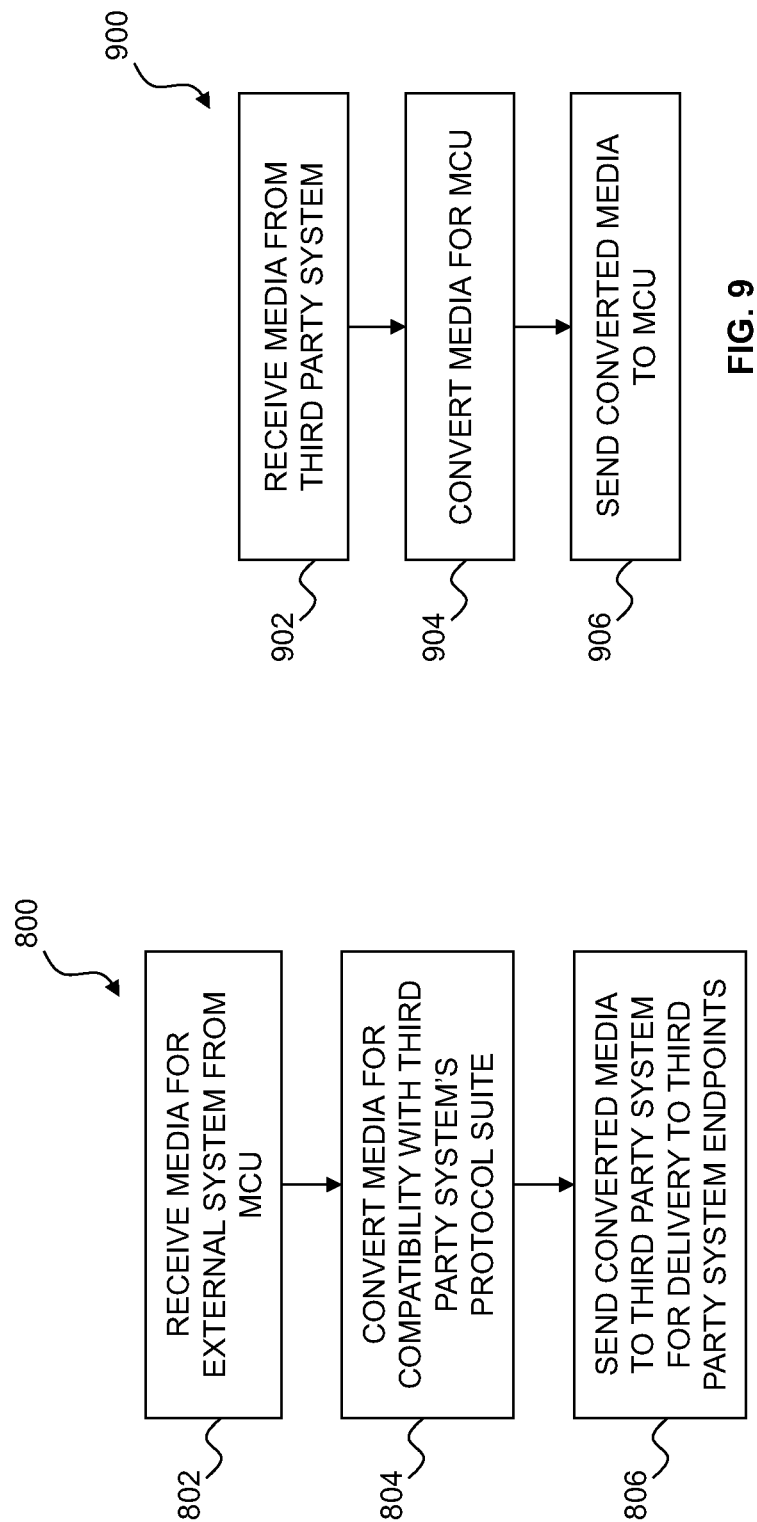

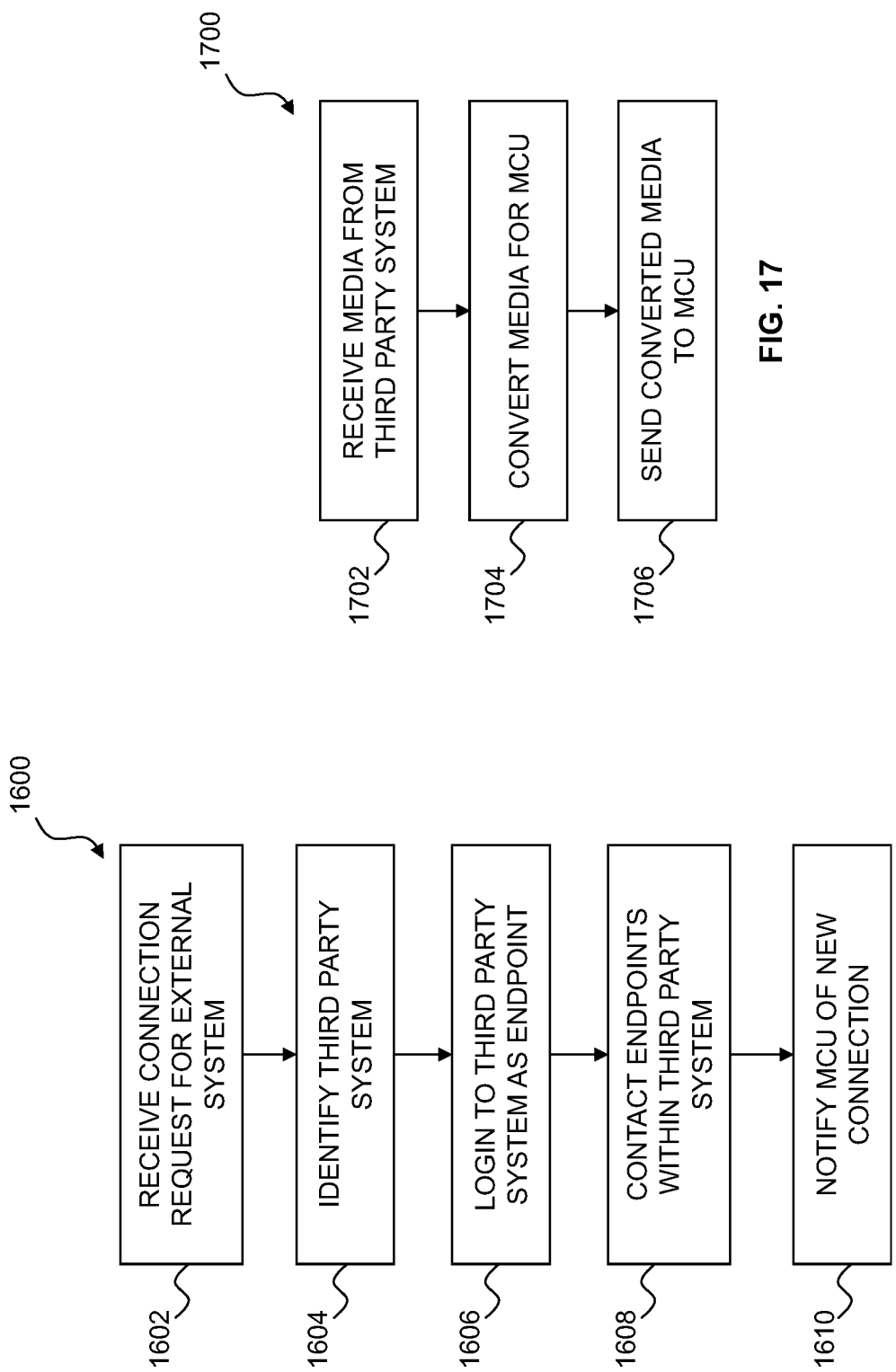

SYSTEM AND METHOD FOR PROVIDING UNIFIED COMMUNICATIONS AND COLLABORATION (UCC) CONNECTIVITY BETWEEN INCOMPATIBLE SYSTEMS

CROSS-REFERENCE TO RELATED APPLICATIONS

This application is a continuation of International PCT Application No. PCT/US15/43630, filed on Aug. 4, 2015, entitled SYSTEM AND METHOD FOR PROVIDING UNIFIED COMMUNICATIONS AND COLLABORATION (UCC) CONNECTIVITY BETWEEN INCOMPATIBLE SYSTEMS. International PCT Application No. PCT/US15/43630 claims benefit of and/or priority to U.S. Provisional Application No. 62/033,439, filed on Aug. 5, 2014, entitled SYSTEM AND METHOD FOR PROVIDING UNIFIED COMMUNICATIONS AND COLLABORATION (UCC) CONNECTIVITY BETWEEN INCOMPATIBLE SYSTEMS. Application Nos. PCT/US15/43630 and 62/033,439 are incorporated by reference herein in their entirety.

BACKGROUND

Communications systems often have limitations that affect communications across system boundaries. Accordingly, what is needed are a system and method that addresses such issues.

BRIEF DESCRIPTION OF THE DRAWINGS

For a more complete understanding, reference is now made to the following description taken in conjunction with the accompanying Drawings in which:

FIG. 8 illustrates a flow chart of one embodiment of a process by which a U2C2 gateway may handle media destined for a third party system within the environment of FIG. 1;

FIG. 9 illustrates a flow chart of one embodiment of a process by which a U2C2 gateway may handle media originating from a third party system within the environment of FIG. 1;

FIG. 16 illustrates a flow chart of one embodiment of a process by which a U2C2 gateway may handle a connection to a third party system within the environment of FIG. 10;

FIG. 17 illustrates a flow chart of one embodiment of a process by which a U2C2 gateway may handle media originating from a third party system within the environment of FIG. 10;

DETAILED DESCRIPTION

Figure 1:
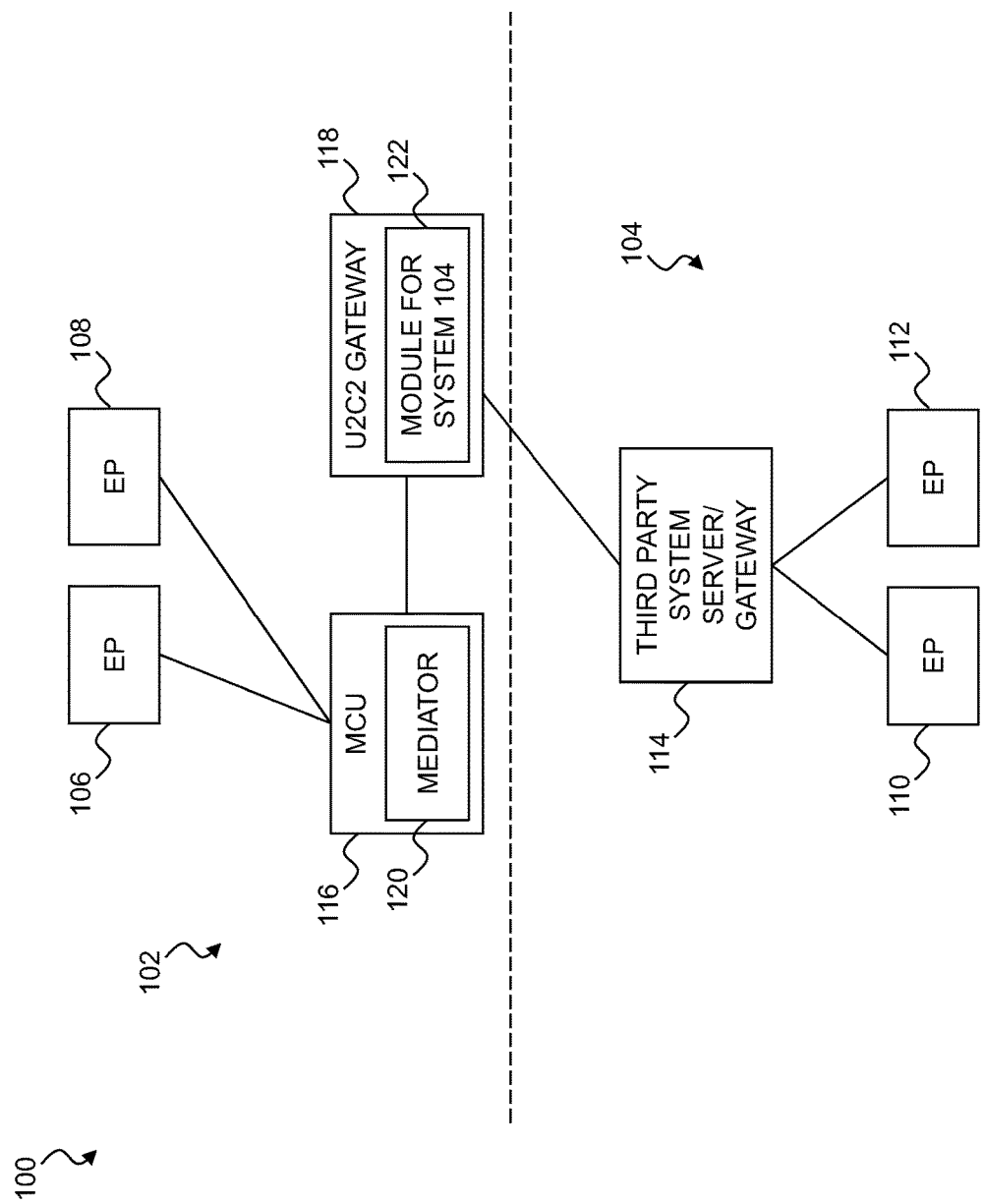
FIG. 1 illustrates one embodiment of an environment with generally incompatible communication systems that may be joined by a universal UCC (U2C2) gateway.

It is understood that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, one embodiment of an environment 100 is illustrated with a communication system 102 and a communication system 104. Each system 102 and 104 provides some level of unified communications and collaboration (UCC) functionality that may include voice, audio, video, instant messaging (IM), presence information, desktop sharing, data sharing, whiteboards, voicemail, e-mail, short message service (SMS) messaging, faxes, and/or other services (all of which may be referred to herein as "media"). It is understood that each system 102 and 104 may provide all of this functionality or may provide only a subset of this functionality.

In the present example, the two systems 102 and 104 provide the UCC functionality using different protocols for communications, which would typically make the two systems 102 and 104 incompatible. In other words, while each system can provide its UCC functionality to users within that system, a user of the system 102 cannot typically communicate with a user of the system 104 as the two systems cannot communicate with one another.

For example, the system 102 may use Amadeo (produced by Damaka, Inc., of Richardson, Tex.) to provide UCC functionality to endpoints 106 and 108. The system 104 may use Lync (produced by Microsoft Corp. of Seattle, Wash.) to provide UCC functionality to endpoints 110 and 112. It is understood that either system 102 and 104 may represent many different systems and Amadeo and Lync are used herein for purposes of example only.

Generally, users of Amadeo and Lync cannot communicate because the systems 102 and 104 are silos and only users within a particular system (and possibly other identical systems if in federated domain relationships) can communicate. For example, Amadeo users can only communicate with other Amadeo users and Lync users can only communicate with other Lync users. Accordingly, users may interact with other users from the same system, but are typically unable to interact with users from the other system or any other system due to the incompatible protocols.

In the present example, the system 104 includes a third party system server/gateway server 114 that may represent one or more servers. For example, the server 114 may represent separate servers that provide UCC functionality to the endpoints 110 and 112, such as a server for audio/video functionality, a server for data functionality, and a server for instant messaging functionality. Alternatively, the server 114 may be a single server that provides multiple components that provide separate channels for the audio/video, data, and instant messaging functionality. In still other embodiments, the server 114 may handle the audio/video, data, and instant messaging functionality in a single channel. In the present embodiment, it does not matter how the server 114 provides the UCC functionality to the endpoints 110 and 112, only that it does so. If the system 104 is a Lync system, the server 114 is a Lync server.

The server 114 also provides a gateway for the system 104 to external networks, such as the system 102. Typically, this enables the system 104 to communicate with other compatible systems and may be used to provide network access (e.g., internet access) to users within the system 104. Depending on the type of system represented by the system 104, the system 104 may be able to form a federated domain relationship with one or more other systems. It is understood that, in some embodiments, the third party system server and the gateway may be on two different servers, although they are combined in the present example.

In the present example, the system 102 includes a multipoint control unit (MCU) 116, a universal UCC (U2C2) gateway 118, and a mediator 120. As will be described below, the U2C2 gateway 118 and the mediator 120 enable the system 102 to communicate with otherwise incompatible systems, such as the system 104, and may not be needed for communications that occur only within the system 102 (e.g., between the endpoints 106 and 108).

The MCU 116 generally operates only within the system 102, although it may include functionality to communicate with other systems in some embodiments. Within the system 102, the MCU 116 is used to provide multipoint UCC functionality to the endpoints 106 and 108. The functionality provided by the U2C2 gateway 118 and the mediator 120 may be used in conjunction with the MCU 116 to extend multipoint UCC conference capabilities to one or more endpoints in other systems, such as the endpoints 110 and 112 in the system 104, and bring those endpoints into a UCC session with one or both of the endpoints 106 and 108.

Generally, an MCU such as the MCU 116 does not initiate communications. More specifically, the MCU 116 will listen for incoming calls, but will not initiate any outgoing messages with endpoints that have not first contacted the MCU. However, in the present example, the MCU 116 has been configured with the mediator 120 to relay messages to endpoints even if those endpoints have not contacted the MCU 116. For example, the mediator 120 may receive an invitation message from the endpoint 106 and relay the message to the endpoint 108. In embodiments where the MCU 116 has not been modified in this manner, the invitation message may be sent to the U2C2 gateway 118 instead of the MCU 116, and the U2C2 gateway 118 would then notify the MCU that there is another connection. In still other embodiments, the mediator 120 may be a separate device from the MCU 116 and the U2C2 gateway 118, and may handle such endpoint messages.

The U2C2 gateway 118 is configured to handle communications between otherwise incompatible networks, such as the system 102 and the system 104. The U2C2 gateway 118 includes a module 122 that enables the U2C2 gateway 118 to communicate with the system 104. More specifically, the module 122 enables the U2C2 gateway 118 to mimic the behavior of the system 104 so that the server 114 believes that the U2C2 gateway 118 is the same type of network as the system 104.

To accomplish this, the module 122 provides the U2C2 gateway 118 with a complete protocol suite for the network type of the system 104. For example, if the server 114 is a Lync server, the module 122 will provide the Lync protocol suite. The protocol suite includes all information needed to communicate with the server 114, including request/response models and security models. In other words, whatever metadata is required by the third party system server 114, the U2C2 gateway 118 will provide through the module 122. Because the U2C2 gateway 118 is presenting itself to the server 114 as the same system type as the server 114, the U2C2 gateway 118 will handle communications in a manner identical to that of the server 114.

The module 122 then translates between the system 104 and the system 102. For example, communications sent from the MCU 116 to the server 114 are received by the U2C2 gateway 118, translated by the U2C2 gateway 118, and sent to the server 114. Similarly, communications sent from the server 114 to the MCU 116 are received by the U2C2 gateway 118, translated by the U2C2 gateway 118, and sent to the server MCU 116.

It is understood that the module 122 may be an integral part of the U2C2 gateway 118, rather than a module. For example, the U2C2 gateway 118 may include the functionality provided by the module 122 rather than obtaining that functionality via the module 122. In the present example, a modular approach is used to simplify the configuration of the U2C2 gateway 118. For example, if the U2C2 gateway 118 is to be configured to communicate with different third party systems, the appropriate module for each system can be loaded into or otherwise provided to the U2C2 gateway 118. Furthermore, changes may be made to a module without affecting the other modules.

Accordingly, rather than requiring an endpoint to dial into the MCU 116 in the conventional passive manner, the U2C2 gateway 118 is able to communicate with other systems and actively pull their endpoints into a UCC session. No changes are required to the third party system or its endpoints. This enables the U2C2 gateway 118 to communicate with any third party system for which it has a module and expands UCC sessions to encompass virtually any type of endpoint.

Figure 2:
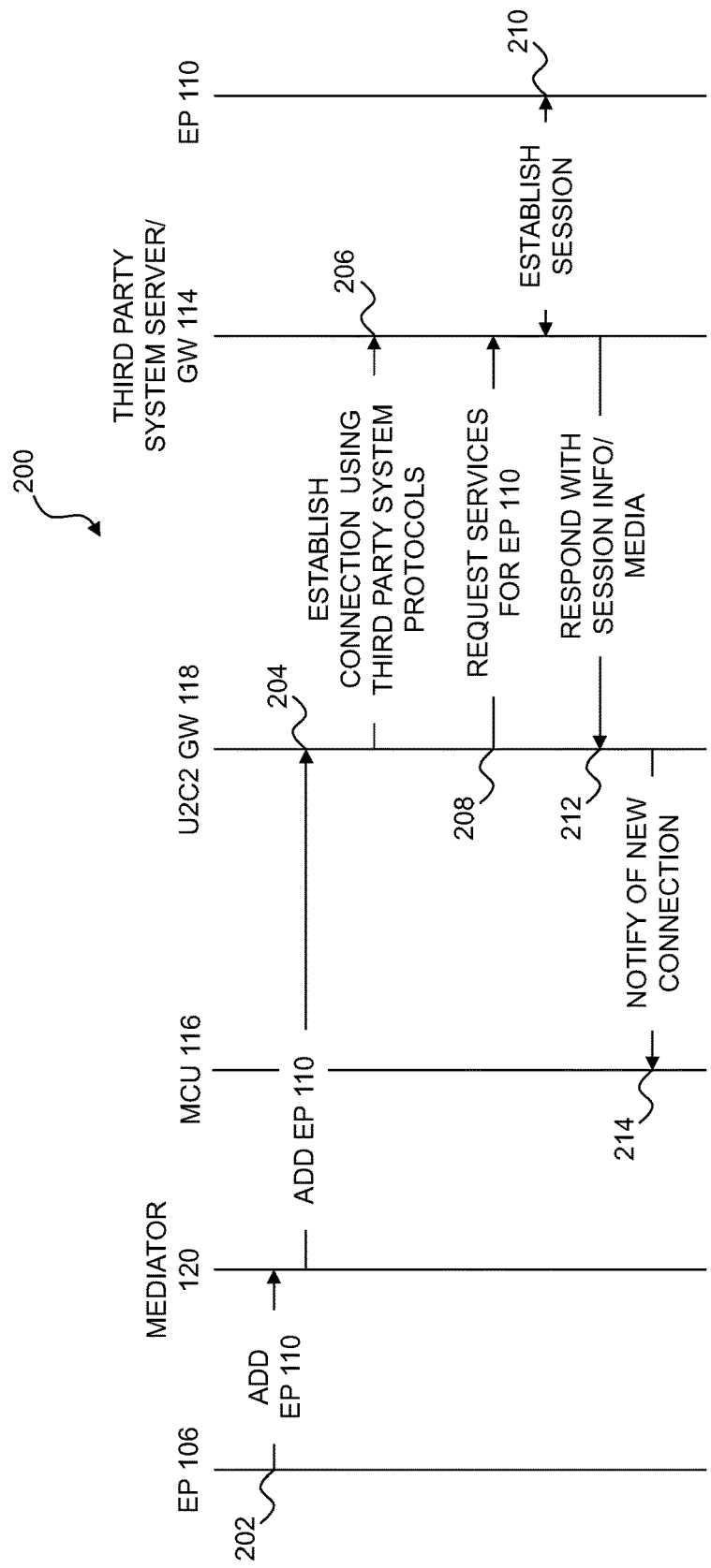
FIG. 2 illustrates a sequence diagram of one embodiment of a process that may be executed to establish a UCC session between the systems of FIG. 1.

Referring to FIG. 2, a sequence diagram 200 illustrates one embodiment of a process that may be executed to enable UCC communications between users in the system 102 and users in the system 104. In the present example, the endpoint 106 of the system 102 would like to add the endpoint 110 of the system 104 to a UCC session.

In step 202, the endpoint 106 sends a request to the MCU 116. The request is handled by the mediator 120 (which is part of the MCU 116 in the present embodiment), which identifies that the request is for an endpoint that is not in the system 102 and forwards the request to the U2C2 gateway 118 in step 204. In step 206, the U2C2 gateway 118 establishes a connection with the server 114 using the protocol suite of the server 114.

In step 208, the U2C2 gateway 118 sends a request for services for the endpoint 110 to the server 114 using the protocol suite of the server 114. For example, the request may be for audio, video, and IM services or for any other combination of available UCC services. In step 210, the server 114 establishes a UCC session with the endpoint 110. In step 112, the server 114 responds to the U2C2 gateway 114 with session information and/or media from the endpoint 110. In step 214, the U2C2 gateway 114 notifies the MCU 116 of the new connection.

It is noted that the MCU 116 has no knowledge that the new connection is with an endpoint in another network (e.g., the system 104 instead of the system 102). The MCU 116 treats the new connection just like any other connection from an endpoint within the system 102, and views the U2C2 118 gateway as the source/destination for any media received from that endpoint or sent to that endpoint.

Figure 3:
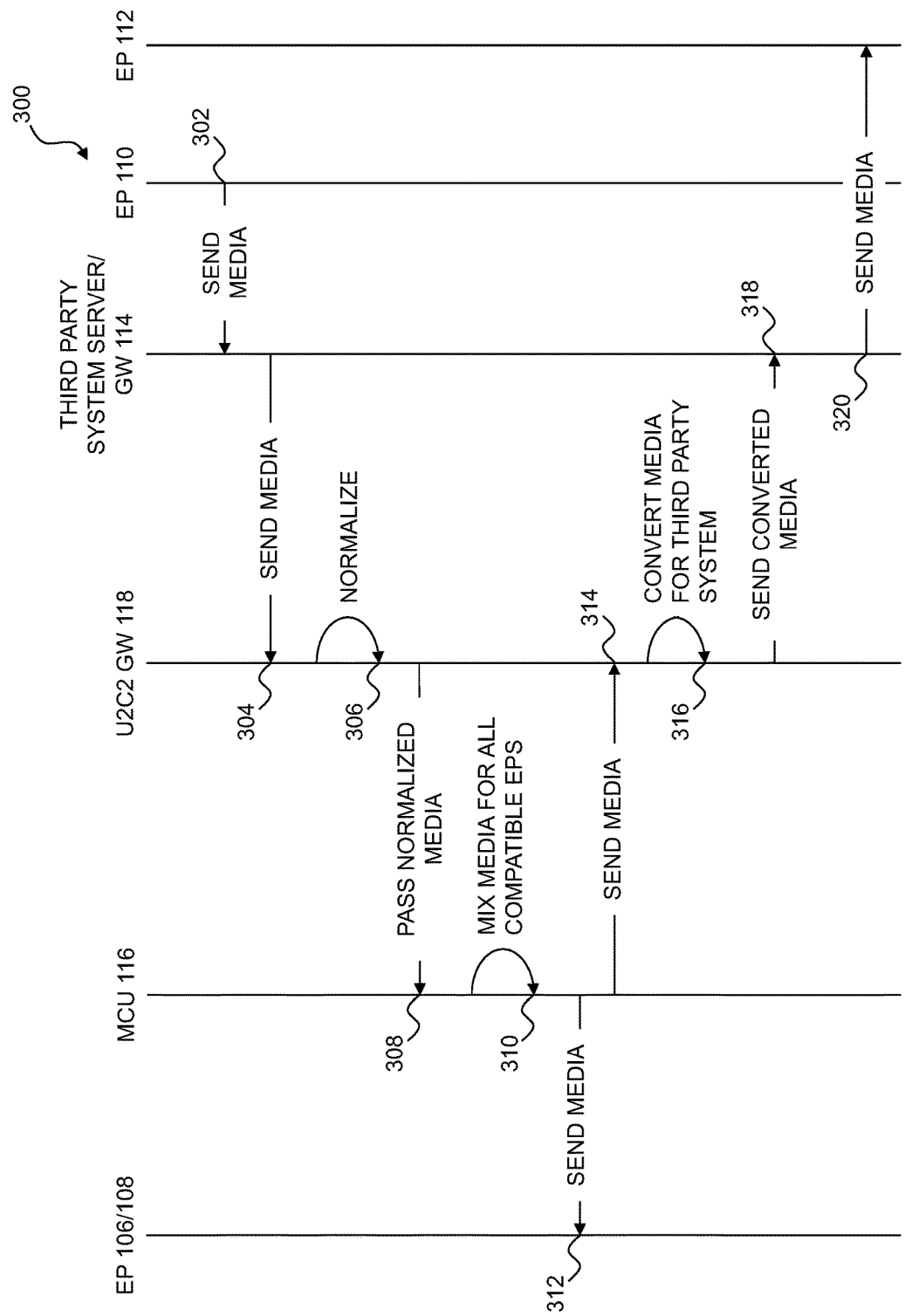
FIG. 3 illustrates a sequence diagram of one embodiment of a process that may be executed to transfer media within a UCC session such as that established with respect to FIG. 2.

Referring to FIG. 3, a sequence diagram 300 illustrates one embodiment of a process that may be executed to transfer UCC communications between users in the system 102 and users in the system 104. In the present example, the endpoint 110 of the system 104 sends information to the UCC session.

In step 302, the endpoint 110 sends media (e.g., audio, video, and/or chat) to the server 114. In step 304, the server 114 sends the media to the U2C2 gateway 118. As the server 114 is operating using its own protocol suite, there is no need to make any changes to the server 114 in order to enable the server 114 to communicate with the U2C2 gateway 118.

In step 306, the U2C2 gateway 118 normalizes the media received from the server 114. The normalization process converts the media for compatibility with the MCU 116. Without normalization, the MCU 116 would not be able to handle the media from the server 114 due to the differences in protocols. Furthermore, the normalization may be used to convert the media from one codec used by the system 104 to another codec used by the system 102. For example, the U2C2 gateway 118 may have a list of codecs that are used by the MCU 116. If the media received in step 304 is not encoded using one of those codecs, the U2C2 gateway 118 can re-encode the media for the MCU 116 using one of the listed codecs. In step 308, the U2C2 gateway 118 sends the normalized media to the MCU 116.

In step 310, the MCU 116 mixes the media to send to all endpoints in the UCC session that can handle that media type. For example, only endpoints that can handle audio will receive audio content from the MCU 116. In the present example, all endpoints are compatible from a media perspective.

In step 312, the MCU 116 sends the media to the endpoints 106 and 108. In step 314, the MCU 116 sends the media to the U2C2 gateway 118. In step 316, the U2C2 gateway 118 converts the media to be compatible with the server 114, which may include re-encoding as described with respect to step 306. In step 318, the U2C2 gateway 118 sends the converted media to the server 114. In step 320, the server 114 sends the media to the endpoint 112. In the present embodiment, the server 114 does not send the media to the endpoint 110 as the endpoint 110 was the originator of the media, but the server 114 may also send the media to the endpoint 110 in other embodiments.

It is understood that the order of steps 312 and 314 may be reversed in some embodiments. In other embodiments, steps 312 and 314 may occur simultaneously.

Figure 4:
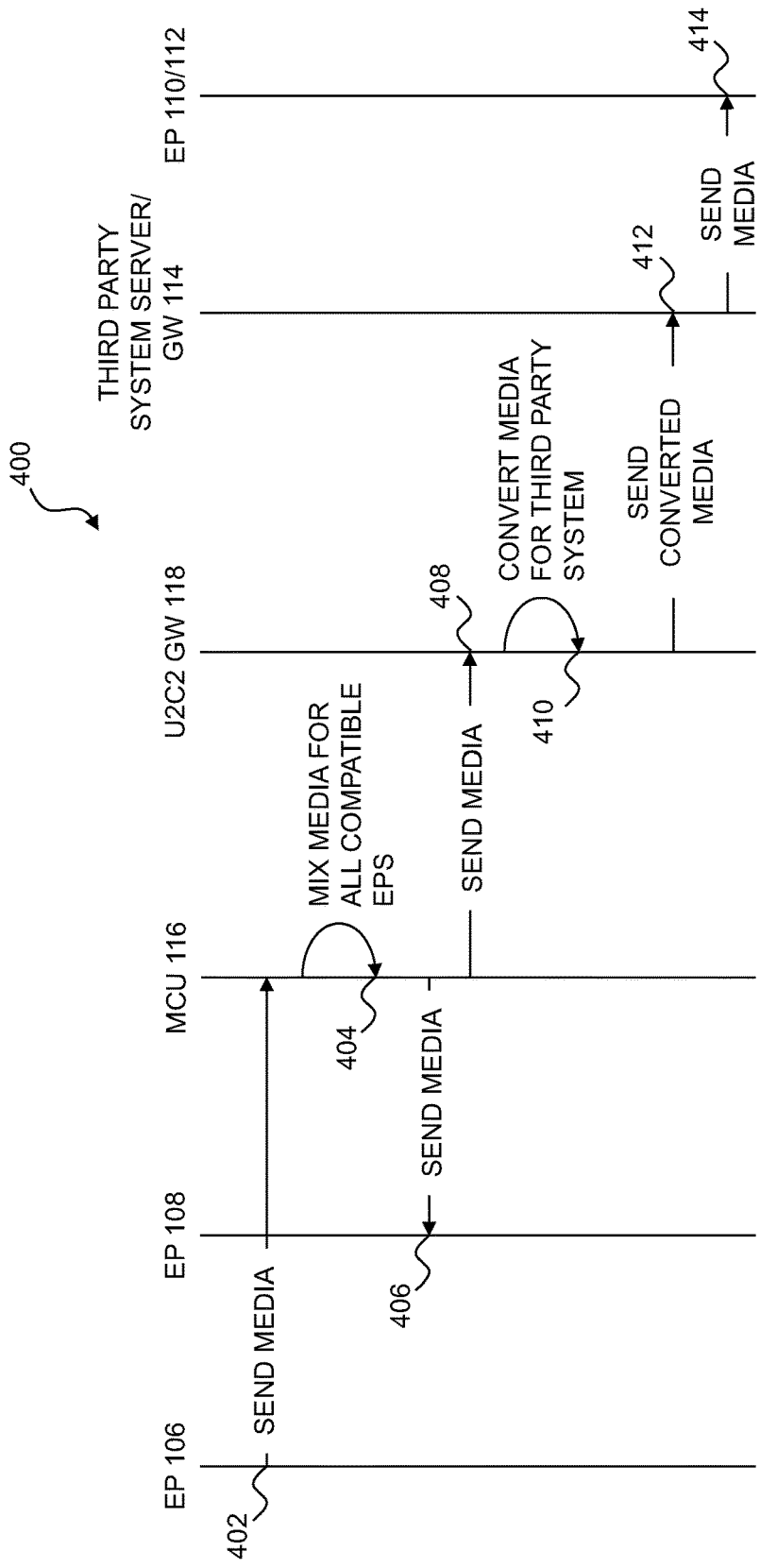
FIG. 4 illustrates a sequence diagram of another embodiment of a process that may be executed to transfer media within a UCC session such as that established with respect to FIG. 2.

Referring to FIG. 4, a sequence diagram 400 illustrates one embodiment of a process that may be executed to transfer UCC communications between users in the system 102 and users in the system 104. In the present example, the endpoint 106 of the system 102 sends information via the UCC session.

In step 402, the endpoint 106 sends media (e.g., audio, video, and/or chat) to the MCU 116. In step 404, the MCU 116 mixes the media to send to all endpoints in the UCC session that can handle that media type. For example, only endpoints that can handle audio will receive audio content from the MCU 116. In the present example, all endpoints are compatible from a media perspective.

In step 406, the MCU 116 sends the media to the endpoint 108. In the present embodiment, the MCU 116 does not send the media to the endpoint 106 as the endpoint 106 was the originator of the media, but the MCU 116 may also send the media to the endpoint 106 in other embodiments.

In step 408, the MCU 116 sends the media to the U2C2 gateway 118. In step 410, the U2C2 gateway 118 converts the media to be compatible with the server 114. In step 412, the U2C2 gateway 118 sends the converted media to the server 116. In step 414, the server 114 sends the media to the endpoints 110 and 112.

It is understood that the order of steps 406 and 408 may be reversed in some embodiments. In other embodiments, steps 406 and 408 may occur simultaneously.

Figure 5:
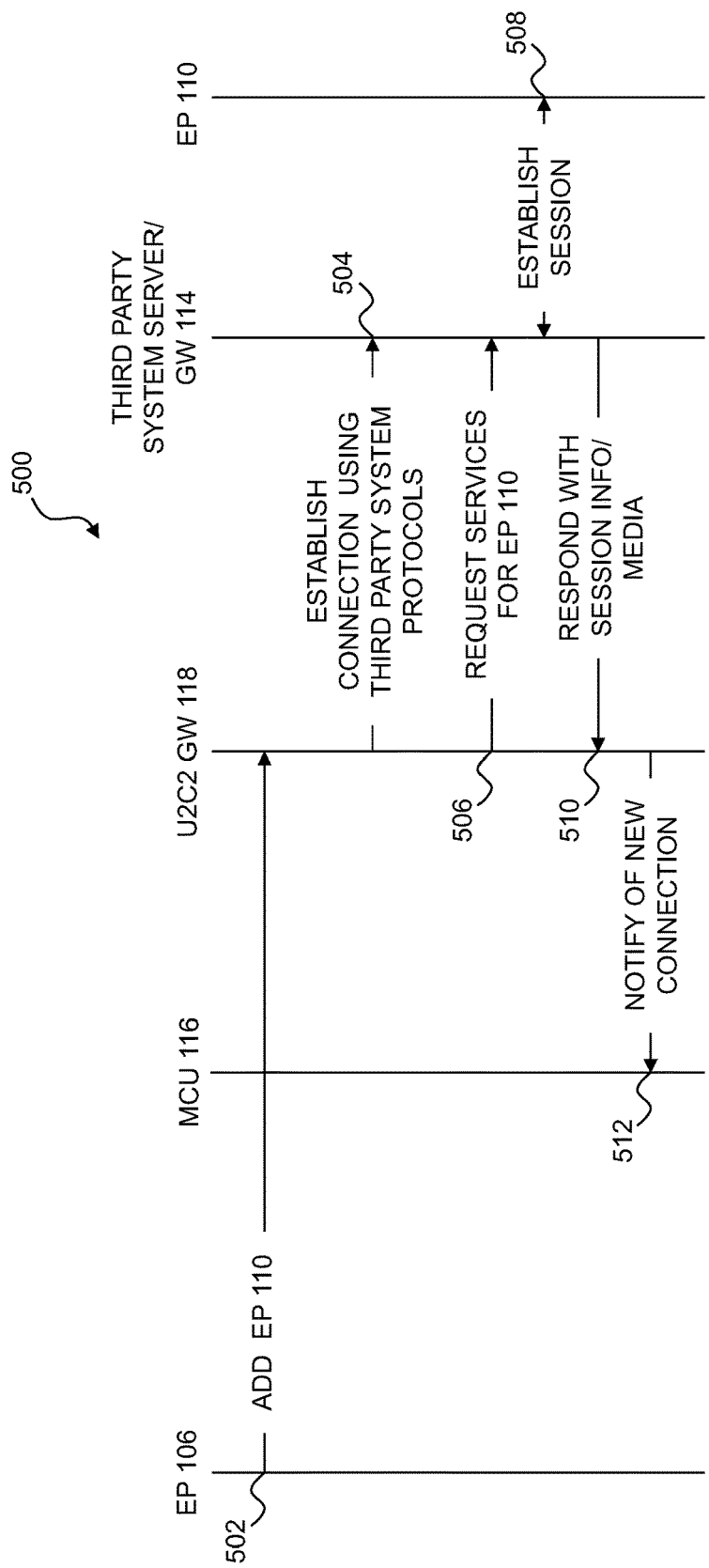
FIG. 5 illustrates a sequence diagram of another embodiment of a process that may be executed to establish a UCC session between the systems of FIG. 1.

Referring to FIG. 5, a sequence diagram 500 illustrates one embodiment of a process that may be executed to enable UCC communications between users in the system 102 and users in the system 104. In the present example, the endpoint 106 of the system 102 would like to add the endpoint 110 of the system 104 to a UCC session. However, unlike FIG. 2, there is either no mediator 120 or the mediator is part of the U2C2 gateway 118. Accordingly, the endpoint 106 communicates directly with the U2C2 gateway 118.

In step 502, the endpoint 106 sends a request to the U2C2 gateway 118. In step 504, the U2C2 gateway 118 establishes a connection with the server 114 using the protocol suite of the server 114. In step 506, the U2C2 gateway 118 sends a request for services for the endpoint 110 to the server 114 using protocol suite of the server 114. For example, the request may be for audio, video, and IM services or for any other combination of available UCC services.

In step 508, the server 114 establishes a UCC session with the endpoint 110. In step 510, the server 114 responds to the U2C2 gateway 114 with session information and/or media from the endpoint 110. In step 512, the U2C2 gateway 114 notifies the MCU 116 of the new connection.

It is noted that the MCU 116 has no knowledge that the new connection is with an endpoint in another network (e.g., the system 104 instead of the system 102). The MCU 116 treats the new connection just like any other connection from an endpoint within the system 102, and views the U2C2 118 gateway as the source/destination for anything received from that endpoint or sent to that endpoint.

Figure 6:
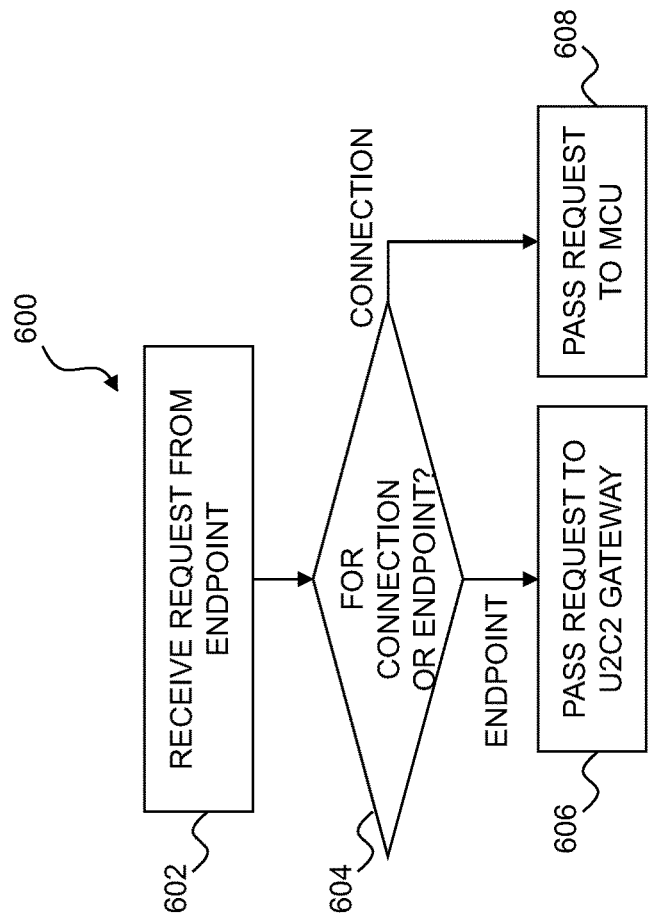
FIG. 6 illustrates a flow chart of one embodiment of a process by which a mediator may handle requests within the environment of FIG. 1.

Referring to FIG. 6, a method 600 illustrates one embodiment of a process that may be executed by the mediator 120 of the system 102 of FIG. 1. In step 602, a request is received from an endpoint within the mediator's system, such as the endpoint 106. In step 604, a determination is made as to whether the request is for the addition of an endpoint that is outside of the system 102 or for a connection to the MCU 116 (e.g., asking for the creation of a UCC session or to be added to an existing UCC session). If the request is for the addition of an endpoint, the mediator 120 sends the request to the U2C2 gateway 118 in step 606. If the request is for a connection to the MCU 116, the mediator 120 sends the request to the MCU 116 in step 608.

Figure 7:
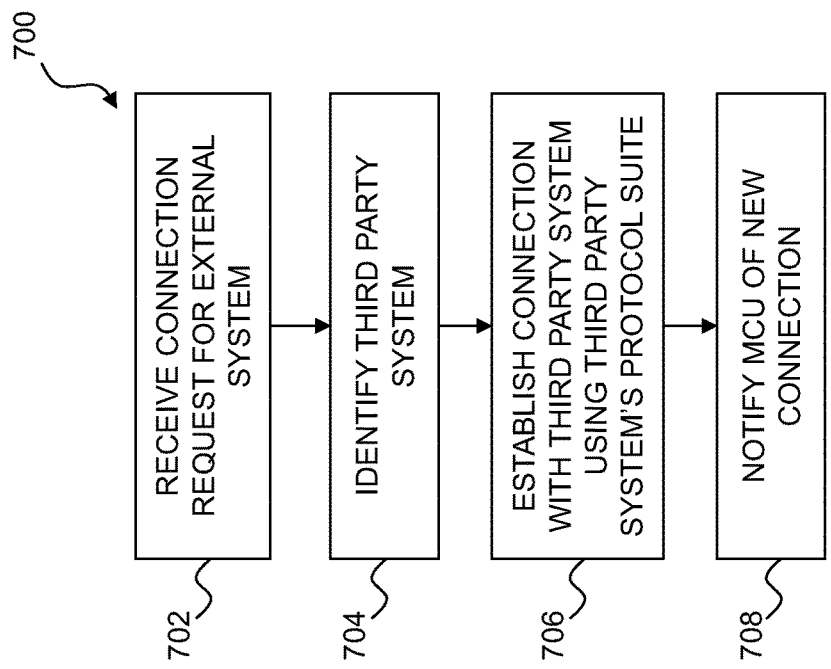
FIG. 7 illustrates a flow chart of one embodiment of a process by which a U2C2 gateway may handle a connection to a third party system within the environment of FIG. 1.

Referring to FIG. 7, a method 700 illustrates one embodiment of a process that may be executed by the U2C2 gateway 118 of the system 102 of FIG. 1. For purposes of this example, it is understood that the U2C2 gateway 118 includes the appropriate module 122 needed to communicate with the system 104.

In step 702, a request is received from the mediator 120. For example, the request may be sent by the mediator 120 in step 606 of FIG. 6. The request may include information identifying a particular UCC session being handled by the MCU 116. This enables the U2C2 gateway 118 to add the requested connection to the proper UCC session later (in step 708).

In step 704, the U2C2 gateway 118 identifies the third party system (e.g., the system 104) needed for the request. The identification may include obtaining information about the third party system, including the type of system (e.g., the protocol suite used), server/gateway addresses, whether the third party system is in a federated domain relationship with the system 102, and/or similar information needed to establish contact. The identification may include accessing one or more lookup tables, querying a local or remote database, querying the system 104 for information, and/or other taking other steps needed to identify the needed information.

In step 706, the U2C2 gateway 118 establishes a connection to the third party system using the third party system's protocol suite. As previously described, the U2C2 gateway 118 behaves exactly like the third party system from a protocol perspective. In step 708, the U2C2 gateway 118 notifies the MCU 116 that the new connection is to be added to the appropriate UCC session being handled by the MCU 116.

Referring to FIG. 8, a method 800 illustrates one embodiment of a process that may be executed by the U2C2 gateway 118 of the system 102 of FIG. 1. In step 802, media is received from the MCU 116 for a connection being managed by the U2C2 gateway 118 to the third party system 104. In step 804, the U2C2 gateway 118 converts the media for compatibility with the third party system's protocol suite. In step 806, the U2C2 gateway 118 sends the converted media to the third party system 104, which will then distribute the media to the appropriate endpoints.

Referring to FIG. 9, a method 900 illustrates one embodiment of a process that may be executed by the U2C2 gateway 118 of the system 102 of FIG. 1. In step 902, media is received from the third party system 104 for a connection managed by the U2C2 gateway 118. In step 904, the U2C2 gateway 118 converts the media for compatibility with the MCU 116. In step 906, the U2C2 gateway 118 sends the converted media to the MCU 116, which will then mix the media if needed and distribute the media to the appropriate endpoints.

Figure 10:
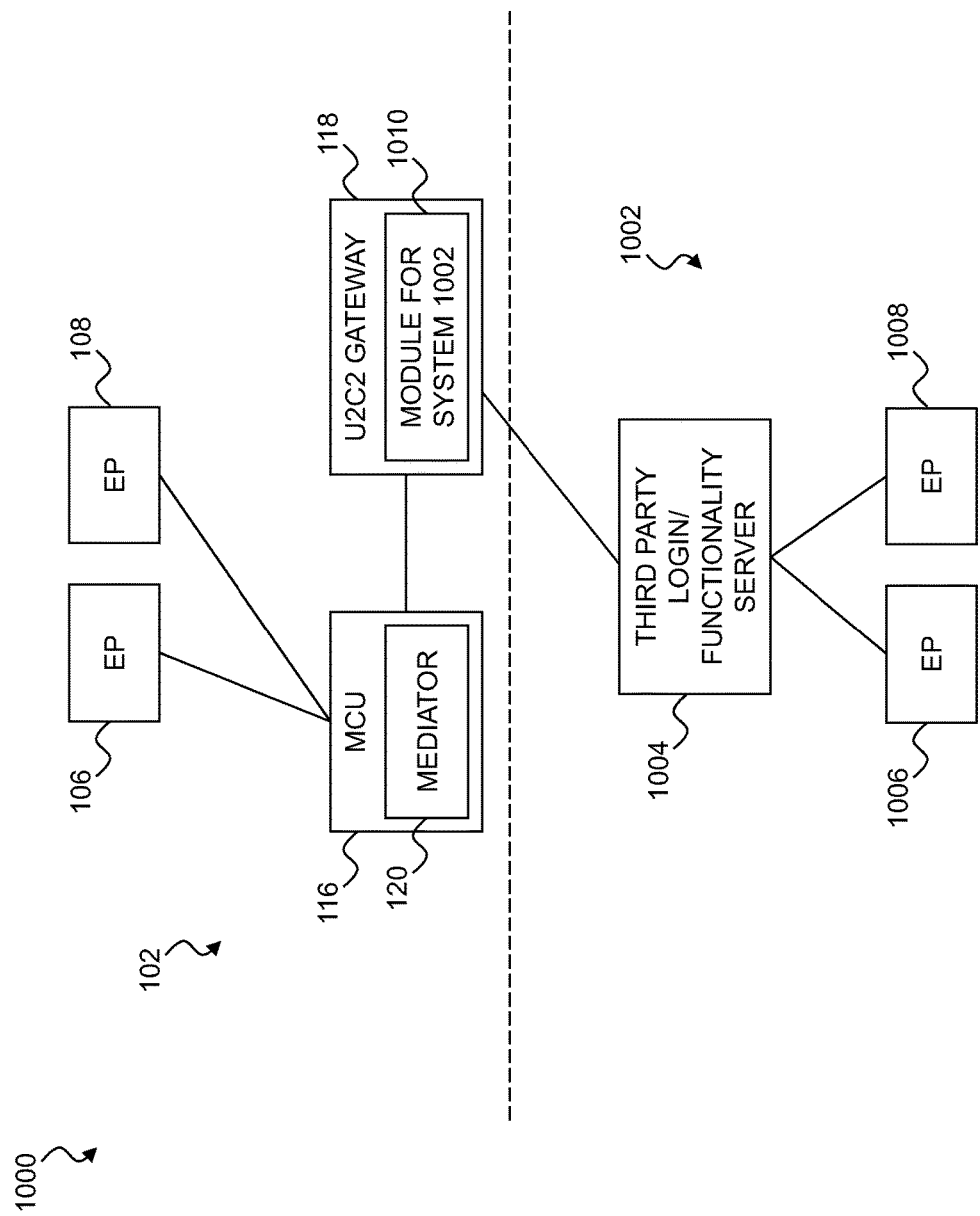
FIG. 10 illustrates another embodiment of an environment with generally incompatible communication systems that may be joined by a U2C2 gateway.

Referring to FIG. 10, one embodiment of an environment 1000 is illustrated with the communication system 102 of FIG. 1 and a communication system 1002. In the present example, unlike the system 104 of FIG. 1, the system 1002 has not exposed any servers/gateways to the U2C2 gateway 118. For example, the system 1002 may be provided by Google Hangouts (as provided by Google Inc., of Mountain View, Calif.) and the U2C2 gateway 118 is unable to communicate directly with servers providing the hangout functionality in the same manner as with the server 114 of FIG. 1.

Accordingly, the U2C2 gateway 118 includes a module 1010. The module 1010 enables the U2C2 gateway 118 to access a login server 1004 that controls access to the third party system's functionality to endpoints such as endpoints 1006 and 1008. Once logged in, the U2C2 gateway 118 is simply an endpoint within the third party system 1002 and is not distinguishable from the endpoints 1006 or 1008 from the perspective of the third party system 1002. The U2C2 gateway 118 can then establish sessions with the endpoints 1006 and 1008, and can include them in UCC sessions via the MCU 116. It is noted that the connections between the U2C2 gateway 118 and the endpoints 1006 and 1008 are not peer to peer connections, but go through the server 1004 that is handling the session in the third party system 1002.

Figure 11:
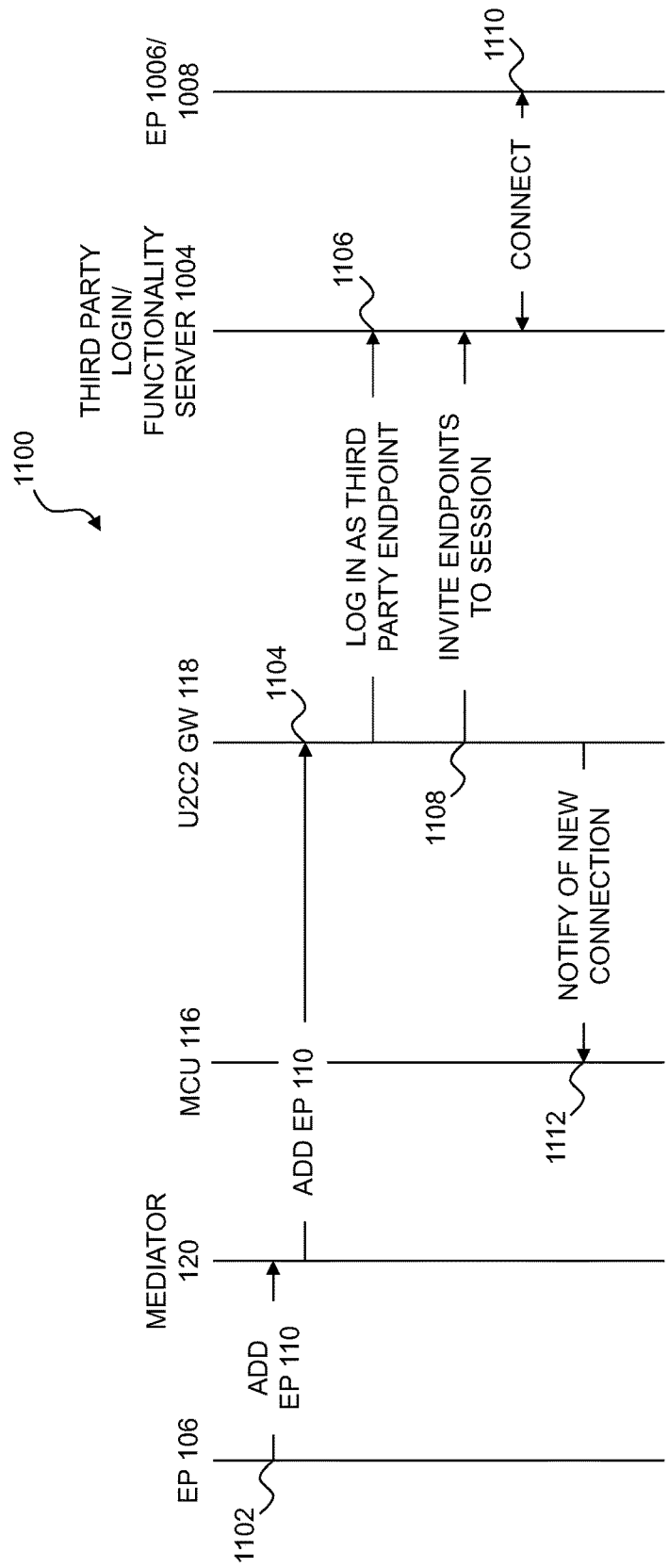
FIG. 11 illustrates a sequence diagram of one embodiment of a process that may be executed to establish a UCC session between the systems of FIG. 10.

Referring to FIG. 11, a sequence diagram 1100 illustrates one embodiment of a process that may be executed to enable UCC communications between users in the system 102 and users in the system 1002. In the present example, the endpoint 106 of the system 102 would like to add the endpoint 1006 of the system 1002 to a UCC session.

In step 1102, the endpoint 106 sends a request to the MCU 116. The request is handled by the mediator 120 (which is part of the MCU 116 in the present embodiment), which identifies that the request is for an endpoint that is not in the system 102 and forwards the request to the U2C2 gateway 118 in step 1104. In step 1106, the U2C2 gateway 118 logs into the third party system 1002 as an endpoint.

In step 1108, the U2C2 gateway 118 connects to the endpoints 1006 and 1008. This occurs using whatever connection mechanism is provided by the third party system 1002. The U2C2 gateway 118 then notifies the MCU 116 of the new connection. All messages will pass through the U2C2 gateway 118 acting as an endpoint in the system 1002.

Figure 12:
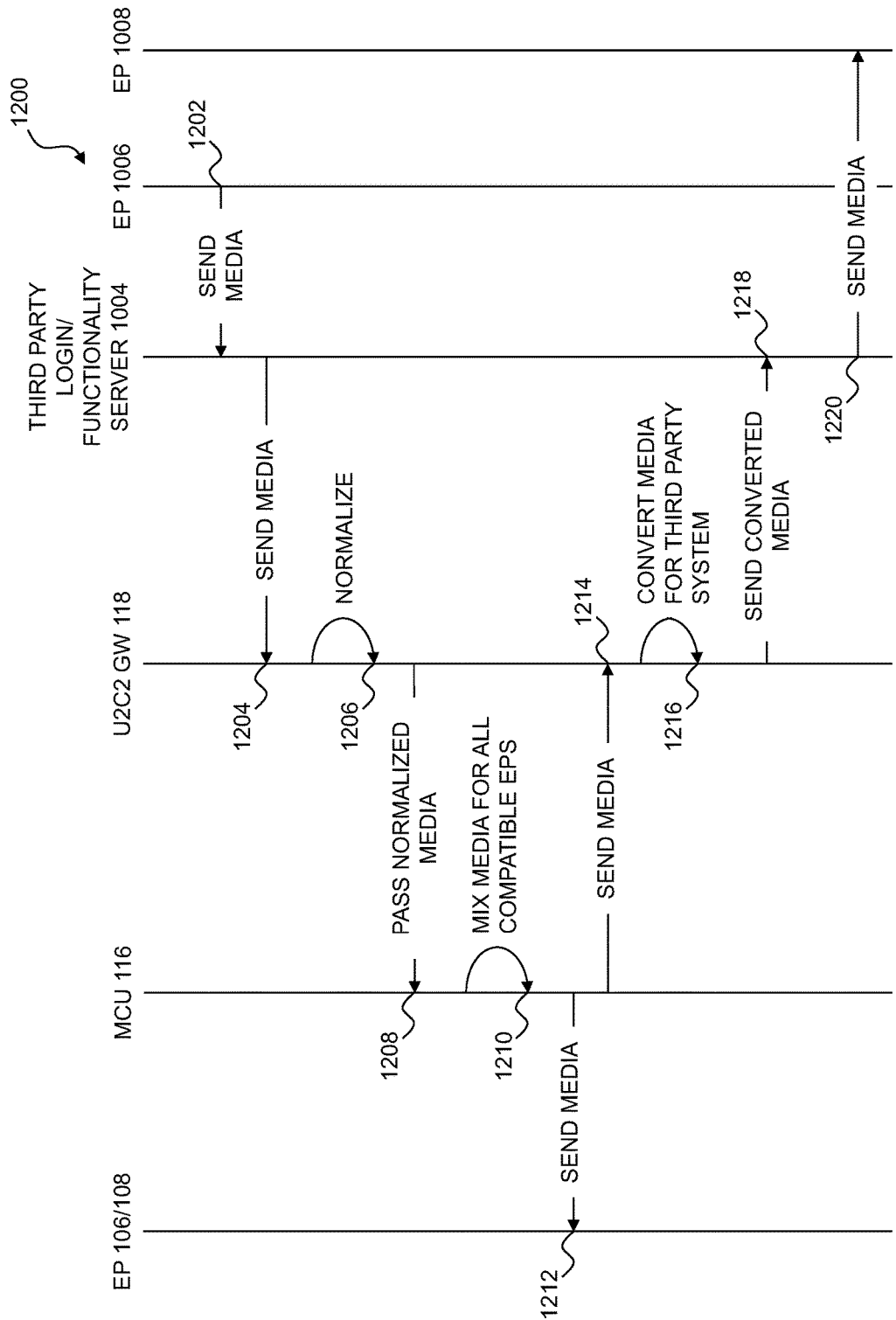
FIGS. 12-15 illustrates sequence diagrams of various embodiments of processes that may be executed to transfer media within a UCC session such as that established with respect to FIG. 11.
Figure 13:
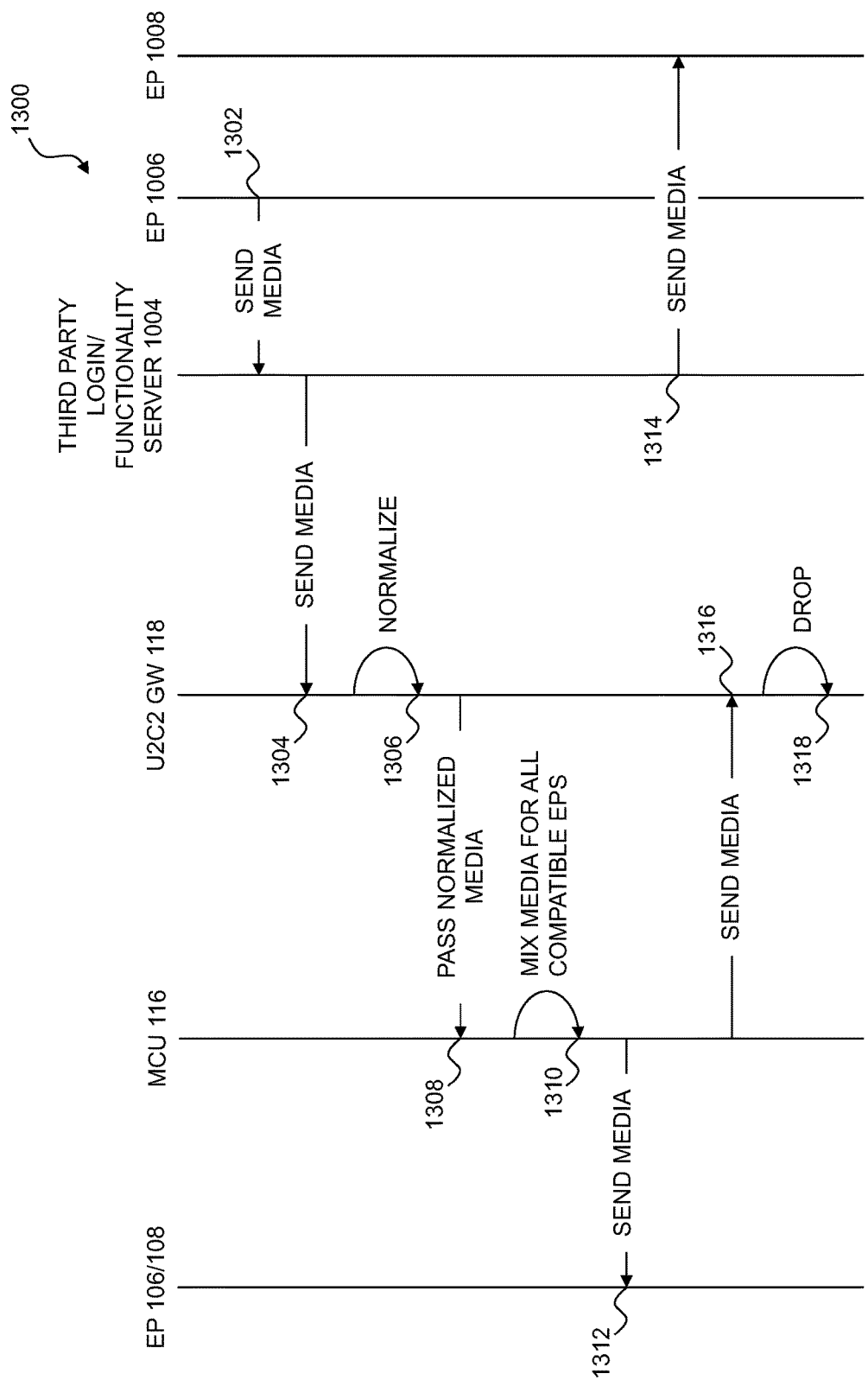
Figure 14:
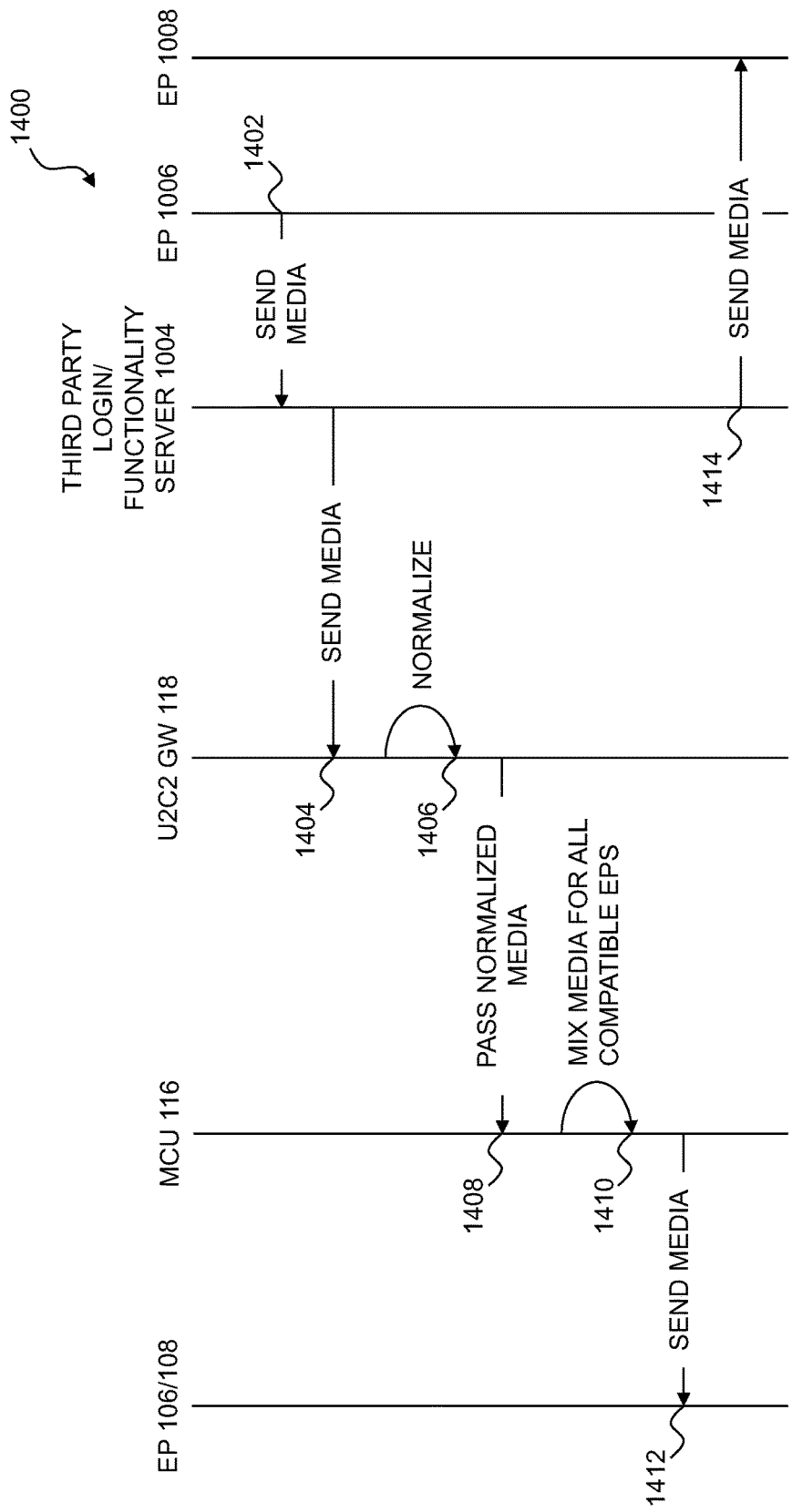

Referring to FIGS. 12-14, sequence diagrams 1200, 1300, and 1400, respectively, illustrate embodiments of processes that may be executed to transfer UCC communications between users in the system 102 and users in the system 1002. In the example of FIG. 12, all media originating within the system 1002 is passed back to the server 1004. In the examples of FIGS. 13 and 14, media originating in the system 1002 is not passed back to the server 1004. This may occur, for example, if the server 1004 automatically handles routing of the media back to all participating endpoints within the system 1002, which would cause duplication if the media was also sent back from the U2C2 gateway 118.

Referring specifically to FIG. 12, some of the illustrated steps are similar to those of FIG. 3 and are not described in detail in the present example. In step 1206, the U2C2 gateway 118 takes the media received as an endpoint within the system 1002 and coverts it for the MCU 116. Similarly, in step 1216, the U2C2 gateway 118 coverts the media received from the MCU 116 before sending it to the server 1004 as an endpoint within the system 1002.

Referring specifically to FIG. 13, some of the illustrated steps are similar to those of FIG. 12 and are not described in detail in the present example. However, the server 1004 sends the media to the endpoint 1008 in step 1314 (which can happen at any time after step 1302) without receiving it from the U2C2 gateway 118. The U2C2 gateway 118 has no control over the server 1004 and cannot prevent this, but this makes it undesirable for the U2C2 gateway 118 to send the media to the endpoint 1008 because the endpoint 1008 would receive the media twice.

Accordingly, after receiving the media from the MCU 116 in step 1316, the U2C2 gateway 118 drops the media in step 1318. This means that the endpoint 1008 will only receive a single copy of the media. This may be accomplished, for example, by configuring the U2C2 gateway 118 to filter media received from the MCU 116 by origination tag or another indicator, and to discard any media that originated from the system 1002. By configuring the U2C2 gateway 118 to drop the media, no modification to the MCU 116 or server 1004 is needed.

Referring specifically to FIG. 14, some of the illustrated steps are similar to those of FIG. 13 and are not described in detail in the present example. As in FIG. 13, the server 1004 sends the media to the endpoint 1008 in step 1414 (which can happen at any time after step 1402). The U2C2 gateway 118 has no control over the server 1004 and cannot prevent this, but this makes it undesirable for the U2C2 gateway 118 to send the media to the endpoint 1008. Accordingly, the MCU 116 does not send the media to the U2C2 gateway 118, thereby removing steps 1316 and 1318 of FIG. 13. It is noted that this may require modification of the MCU 116 so that it knows not to return media originating from the U2C2 gateway 118.

Figure 15:
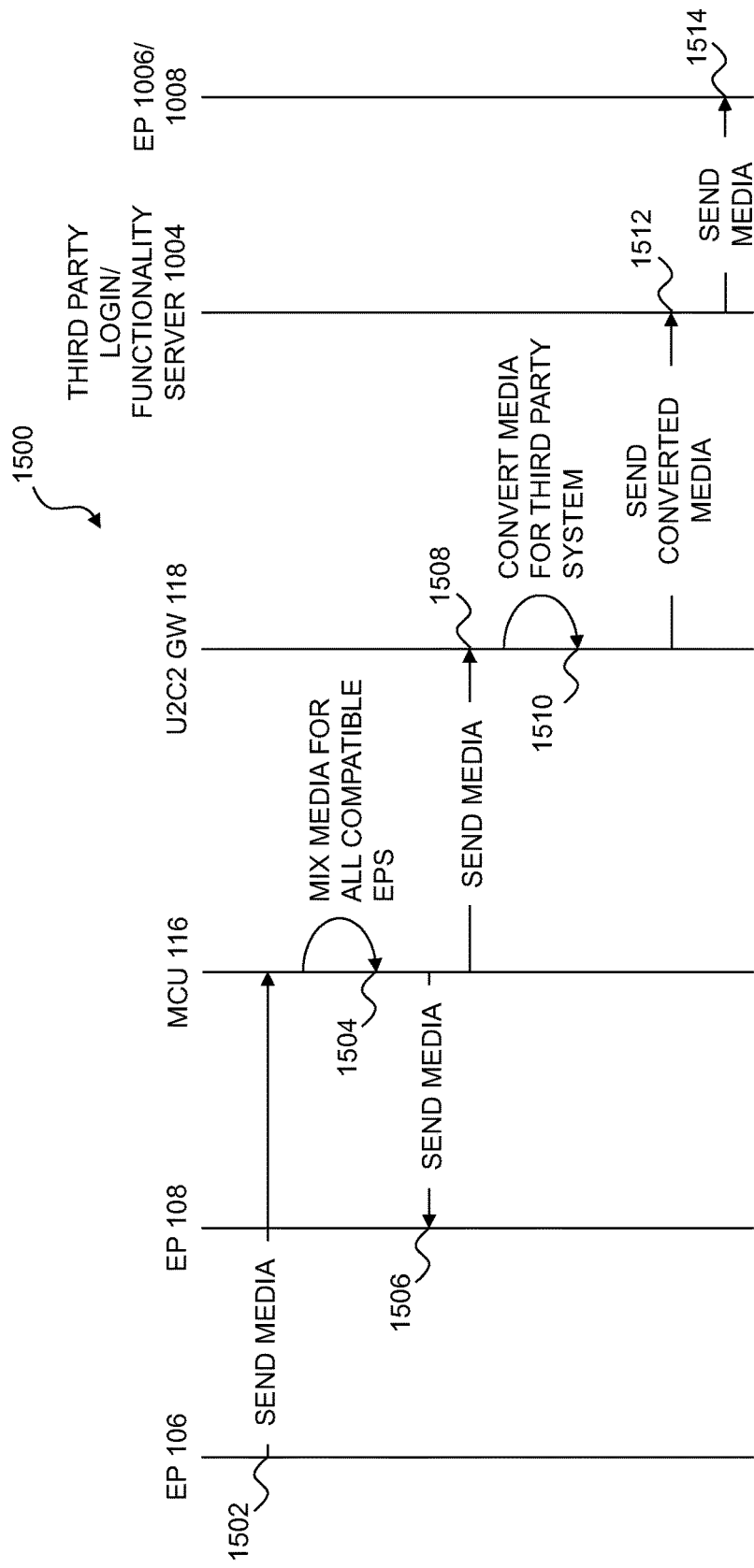

Referring to FIG. 15, a sequence diagram 1500 illustrates one embodiment of a process that may be executed to transfer UCC communications between users in the system 102 and users in the system 1002. In the present example, the endpoint 106 of the system 102 sends information via the UCC session. Some of the illustrated steps are similar to those of FIG. 4 and are not described in detail in the present example. It is noted that the issue of FIGS. 13 and 14 is not present in this example as the media is originating from the system 102 and not the system 1002.

In step 1510, the U2C2 gateway 118 takes the media received from the MCU 116 and coverts it for the system 1002. Then, acting as an endpoint within the system 1002, the U2C2 gateway 118 sends the media to the server 1004 in step 1512. The server 1004 then passes the media to the endpoints 1006 and 1008 in step 1514.

Referring to FIG. 16, a method 1600 illustrates one embodiment of a process that may be executed by the U2C2 gateway 118 of the system 102 of FIG. 10. For purposes of this example, it is understood that the U2C2 gateway 118 includes the appropriate module 1002 needed to communicate with the system 1004.

In step 1602, a request is received from the mediator 120. The request may include information identifying a particular UCC session being handled by the MCU 116. This enables the U2C2 gateway 118 to add the requested connection to the proper UCC session later (in step 1608).

In step 1604, the U2C2 gateway 118 identifies the third party system (e.g., the system 1002) needed for the request. The identification may include obtaining information about the third party system, including the server/gateway addresses, login information, and/or similar information needed to establish contact. The identification may include accessing one or more lookup tables, querying a local or remote database, querying the system 1002 for information, and/or other taking other steps needed to identify the needed information.

In step 1606, the U2C2 gateway 118 logs into the third party system 1002 using previously established login credentials (e.g., user name and password). The U2C2 gateway 118 behaves exactly like an endpoint within the third party system 1002. In step 1608, the U2C2 gateway 118 contact the endpoint(s) within the system 1002. In step 1610, the U2C2 gateway 118 notifies the MCU 116 that the new connection is to be added to the appropriate UCC session being handled by the MCU 116.

Referring to FIG. 17, a method 1700 illustrates one embodiment of a process that may be executed by the U2C2 gateway 118 of the system 102 of FIG. 10. In step 1702, media is received from a third party system for a connection managed by the U2C2 gateway 118 (e.g., a third party system within which the U2C2 gateway 118 is present as an endpoint). In step 1704, the U2C2 gateway 118 converts the media for compatibility with the MCU 116. In step 1706, the U2C2 gateway 118 sends the converted media to the MCU 116, which will then mix the media if needed and distribute the media to the appropriate endpoints.

Figure 18:
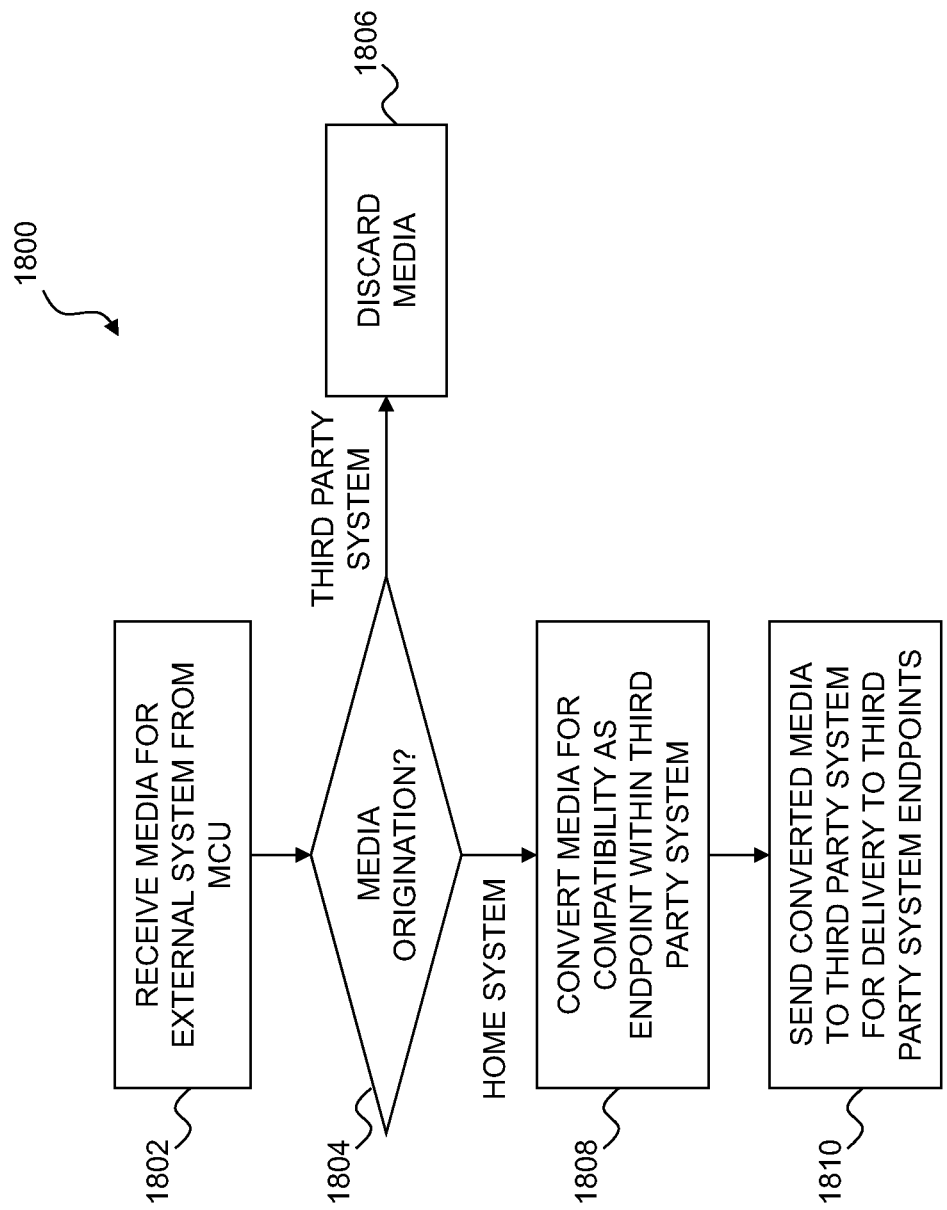
FIG. 18 illustrates a flow chart of one embodiment of a process by which a U2C2 gateway may handle media destined for a third party system within the environment of FIG. 10.

Referring to FIG. 18, a method 1800 illustrates one embodiment of a process that may be executed by the U2C2 gateway 118 of the system 102 of FIG. 10. In step 1802, media is received from the MCU 116 for a connection managed by the U2C2 gateway 118 for the third party system 1002. In step 1804, a determination is made as to the origin of the media. If the media originated from the third party system 1002, the method 1800 moves to step 1806 and discards the media to prevent the media from being duplicated within the system 1002 as described with respect to FIG. 13. If the media originated from the system 102, the method 1800 moves to step 1808.

In step 1808, the U2C2 gateway 118 converts the media for compatibility with the endpoint behavior of the U2C2 gateway 118 within the third party system 1002. In step 1810, the U2C2 gateway 118 sends the converted media to the third party system, which will then distribute the media to the appropriate endpoints.

In embodiments where the U2C2 gateway 118 is not responsible for dropping the media to prevent duplication from occurring, steps 1804 and 1806 may be removed. In such embodiments, either the U2C2 gateway 118 will pass all media through to the system 1002 (as shown in FIG. 12) or the U2C2 gateway 118 will not receive the media from the MCU 116 at all (as shown in FIG. 14).

Figure 19:
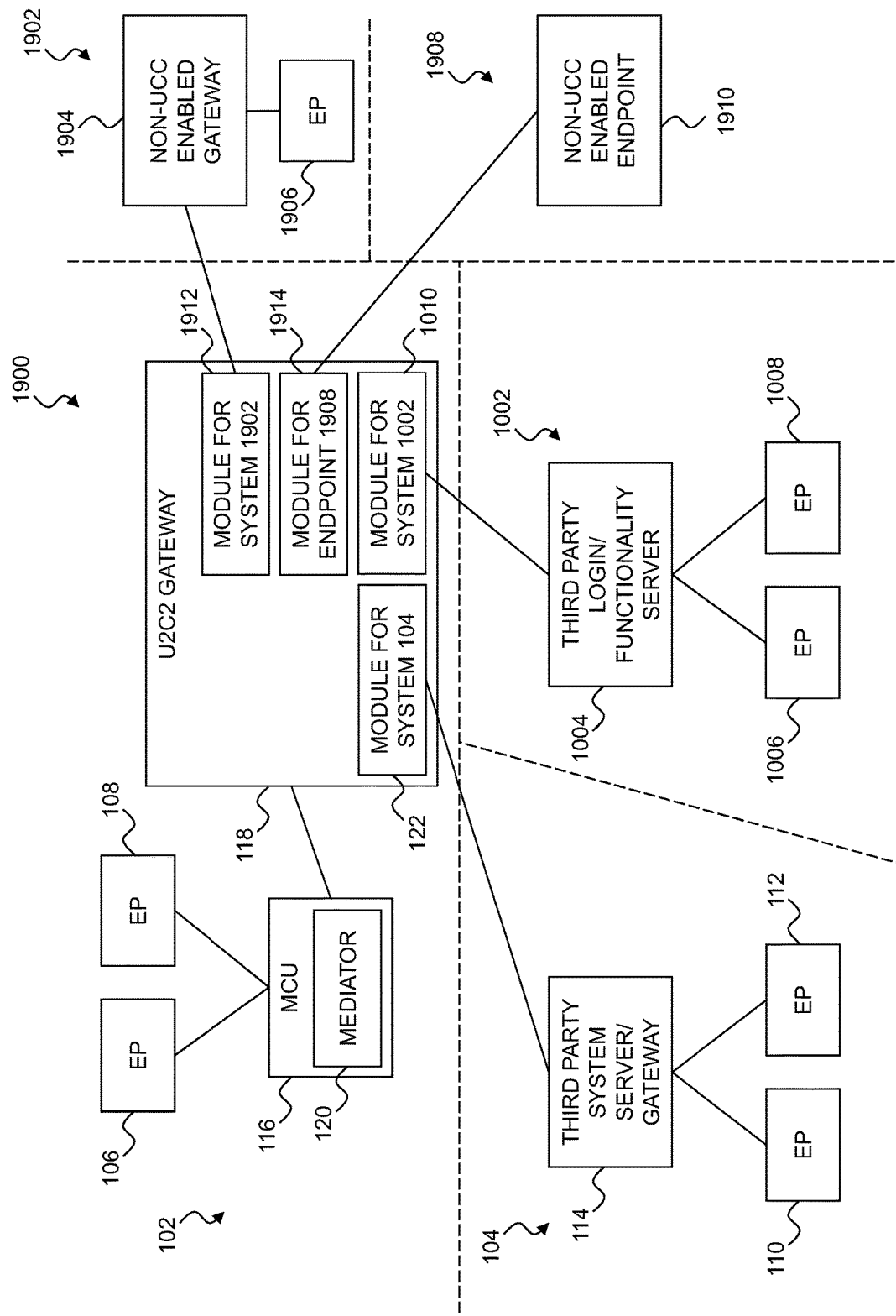
FIG. 19 illustrates yet another embodiment of an environment with generally incompatible communication systems that may be joined by a U2C2 gateway.

Referring to FIG. 19, one embodiment of an environment 1900 is illustrated with the communication systems 102 and 104 of FIG. 1 and the communication system 1002 of FIG. 10. Because the U2C2 gateway 118 can connect to many different types of systems and include those systems in a single UCC session, it can pull the endpoints 110, 112, 1006, and 1008 into a single UCC session with each other, as well as with the endpoints 106 and 108.

Furthermore, any system and/or endpoint for which the U2C2 gateway 118 has a module can be included into a UCC session, thereby providing UCC functionality to even non-UCC enabled systems and endpoints. For example, a system 1902 includes a non-UCC enabled gateway 1904 that is coupled to an endpoint 1906. A system 1908 includes a non-UCC enabled endpoint 1910. The U2C2 gateway 118 is able to communicate with the system 1902 via a module 1912 and with the system 1908 via a module 1914. The endpoints 1906 and 1910 can be added to a UCC session with any of the endpoints 106, 108, 110, 112, 1006, 1008, and each other.

For example, the U2C2 gateway 118 can provide as much UCC functionality to an endpoint as can be handled by that endpoint. If the endpoint 110 can handle audio, video, and IM and the endpoint 1910 can only handle IM, then the U2C2 gateway 118 will inform the MCU 116 of those capabilities and the MCU 116 will only mix the media for a particular endpoint based on that endpoint's capabilities. This enables even limited endpoints to participate in a UCC session in whatever way they can and does not require them to have particular capabilities.

For example, an endpoint may use Twitter (provided by Twitter, Inc., of San Francisco, Calif.), Facebook (provided by Facebook, Inc., of Menlo Park, Calif.), Webex (provided by Cisco Systems, Inc., of San Jose, Calif.), Sametime (provided by International Business Machines Corporation (IBM) of Armonk, N.Y.), Facetime (provided by Apple, Inc., of Cupertino, Calif.), and/or any other functionality. An endpoint may have access to Cisco Call Manager (provided by Cisco Systems, Inc., of San Jose, Calif.), a public switched telephone network (PSTN), a session initiation protocol (SIP) gateway, and/or any other network component or network type. The endpoint may be any device that is able to communicate over a network, including such devices as teleconferencing systems provided by Tandberg (provided by Cisco Systems, Inc., of San Jose, Calif.) and Polycom, Inc., of San Jose, Calif. As long as the U2C2 gateway 118 has the access to the modules needed to configure the U2C2 gateway 118 to communicate in the desired manner, an endpoint can have virtually any functionality and be coupled to other endpoints via the U2C2 gateway 118.

Figure 20:
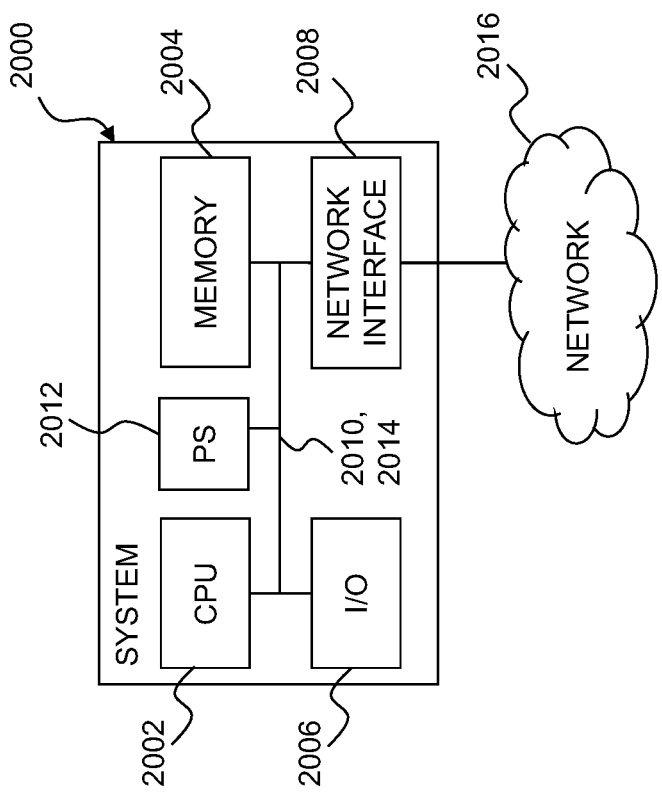
FIG. 20 illustrates one embodiment of a system that may be used within the environment of FIG. 1.

Referring to FIG. 20, one embodiment of a system 2000 is illustrated. The system 2000 is one possible example of a device such as an MCU, a mediator (if implemented as a standalone device), a U2C2 gateway, an endpoint, and/or another server/gateway of FIGS. 1, 10, and 19. Embodiments of the device 2000 include cellular telephones (including smart phones), personal digital assistants (PDAs), netbooks, tablets, laptops, desktops, workstations, servers, telepresence consoles, and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications. It is understood that the system 2000 may be implemented in many different ways and by many different types of systems, and may be customized as needed to operate within a particular environment.

The system 2000 may include a controller (e.g., a central processing unit ("CPU")) 2002, a memory unit 2004, an input/output ("I/O") device 2006, and a network interface 2008. The components 2002, 2004, 2006, and 2008 are interconnected by a transport system (e.g., a bus) 2010. A power supply (PS) 2020 may provide power to components of the computer system 2000, such as the CPU 2002 and memory unit 2004, via a power system 2014 (which is illustrated with the transport system 2010 but may be different).

It is understood that the system 2000 may be differently configured and that each of the listed components may actually represent several different components. For example, the CPU 2002 may actually represent a multi-processor or a distributed processing system; the memory unit 2004 may include different levels of cache memory, main memory, hard disks, and remote storage locations; the I/O device 2006 may include monitors, keyboards, and the like; and the network interface 2008 may include one or more network cards providing one or more wired and/or wireless connections to a network 2016. Therefore, a wide range of flexibility is anticipated in the configuration of the system 2000.

The system 2000 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, servers, and embedded devices depending on the use of the system 2000. The operating system, as well as other instructions, may be stored in the memory unit 2004 and executed by the processor 2002. For example, if the system 2000 is an MCU, a mediator, or a U2C2 gateway, the memory unit 2004 may include instructions for performing the applicable methods described herein.

While the preceding description shows and describes one or more embodiments, it will be understood by those skilled in the art that various changes in form and detail may be made therein without departing from the spirit and scope of the present disclosure. For example, various steps illustrated within a particular flow chart or sequence diagram may be combined or further divided. In addition, steps described in one flow chart or diagram may be incorporated into another flow chart or diagram. Furthermore, the described functionality may be provided by hardware and/or software, and may be distributed or combined into a single platform. Additionally, functionality described in a particular example may be achieved in a manner different than that illustrated, but is still encompassed within the present disclosure. Therefore, the claims should be interpreted in a broad manner, consistent with the present disclosure.

For example, in one embodiment, a method for enabling communications between incompatible communication systems includes receiving, by a universal unified communications and collaboration (U2C2) gateway in a first system, a request originating from a first endpoint in the first system, wherein the request invites a second endpoint in a second system that is incompatible with the first system into a unified communications and collaboration (UCC) session with the first endpoint; establishing, by the U2C2 gateway, a connection with a server in the second system in order to communicate with the second endpoint, wherein the U2C2 gateway uses a plurality of protocols and behaviors defined for use by the second system when communicating with the server in order to make the first system appear to be compatible with the second system; notifying, by the U2C2 gateway, a multipoint control unit (MCU) within the first system of the connection, wherein the MCU manages the UCC session and wherein the U2C2 gateway is recognized by the MCU as a source and a destination for communications corresponding to the second endpoint in the UCC session; normalizing, by the U2C2 gateway, media received from the second endpoint via the server for compatibility with the first system before sending the media to the MCU for the UCC session; and normalizing, by the U2C2 gateway, media received from the MCU for compatibility with the second system before sending the media to the second endpoint via the server.

In some embodiments, the U2C2 gateway is configured to communicate with a plurality of systems outside of the first system, the method further comprising determining, by the U2C2 gateway, which of the plurality of systems contains the second endpoint.

In some embodiments, the U2C2 gateway is configured with a plurality of modules that enable the U2C2 gateway to communicate with the plurality of systems, the method further comprising selecting, by the U2C2 gateway, one of the plurality of modules for communication with the second system.

In some embodiments, the request originating from the first endpoint is received by the U2C2 gateway from a mediator.

In some embodiments, the mediator is located on the MCU.

In some embodiments, the request originating from the first endpoint is received by the U2C2 gateway directly from the first endpoint.

In some embodiments, establishing, by the U2C2 gateway, the connection with the server in the second system includes logging into the server as an endpoint of the second system.

In some embodiments, the method further includes receiving, by the U2C2 gateway, a second request originating from the first endpoint, wherein the second request invites a third endpoint in a third system that is incompatible with the first system and the second system into the UCC session; establishing, by the U2C2 gateway, a second connection with a second server in the third system in order to communicate with the third endpoint, wherein the U2C2 gateway uses a plurality of protocols and behaviors defined for use by the third system when communicating with the second server in order to make the first system appear to be compatible with the third system; notifying, by the U2C2 gateway, the MCU of the second connection, wherein the U2C2 gateway is recognized by the MCU as both source and destination for communications corresponding to the third endpoint in the UCC session; normalizing, by the U2C2 gateway, media received from the third endpoint for compatibility with the first system before sending the media to the MCU for the UCC session; and normalizing, by the U2C2 gateway, media received from the MCU for compatibility with the third system before sending the media to the third endpoint.

In another embodiment, a method for enabling communications between incompatible communication systems includes receiving, by a universal unified communications and collaboration (U2C2) gateway in a first system, a request originating from a first endpoint in the first system, wherein the request invites a second endpoint in a second system that is incompatible with the first system into a unified communications and collaboration (UCC) session with the first endpoint; establishing, by the U2C2 gateway, a connection with a server in the second system in order to communicate with the second endpoint, wherein the U2C2 gateway logs into the server as a registered endpoint of the second system in order to be compatible with the second system; notifying, by the U2C2 gateway, a multipoint control unit (MCU) within the first system of the connection, wherein the MCU manages the UCC session and wherein the U2C2 gateway is recognized by the MCU as a source and a destination for communications corresponding to the second endpoint in the UCC session; normalizing, by the U2C2 gateway, media received from the second endpoint via the server for compatibility with the first system before sending the media to the MCU for the UCC session; and normalizing, by the U2C2 gateway, media received from the MCU for compatibility with the second system before sending the media to the second endpoint via the server.

In some embodiments, the method further includes adding a third endpoint in the second system to the UCC session, wherein the U2C2 gateway is recognized by the MCU as the source and destination for communications corresponding to the third endpoint in the UCC session; and upon receiving media from the MCU to send to the second system, dropping any of the media that originated in the second system prior to sending any media originating in the first system to the server.

In some embodiments, the method further includes adding a third endpoint in the second system to the UCC session, wherein the U2C2 gateway is recognized by the MCU as the source and destination for communications corresponding to the third endpoint in the UCC session; and upon receiving media from the MCU to send to the second system, sending the media to the second endpoint only if the media did not originate from the second endpoint, and sending the media to the third endpoint only if the media did not originate from the third endpoint.

In some embodiments, the U2C2 gateway is configured to communicate with a plurality of systems outside of the first system, the method further comprising determining, by the U2C2 gateway, which of the plurality of systems contains the second endpoint.

In some embodiments, the U2C2 gateway is configured with a plurality of modules that enable the U2C2 gateway to communicate with the plurality of systems, the method further comprising selecting, by the U2C2 gateway, one of the plurality of modules for communication with the second system.

In some embodiments, the request originating from the first endpoint is received by the U2C2 gateway from a mediator.

In some embodiments, the request originating from the first endpoint is received by the U2C2 gateway directly from the first endpoint.

In yet another embodiment, a first system includes a universal unified communications and collaboration (U2C2) gateway configured to support a unified communications and collaboration (UCC) session between a first endpoint in the first system and a second endpoint in a second system that is incompatible with the first system, wherein the U2C2 gateway uses a plurality of protocols and behaviors defined for use by the second system when communicating with a server in the second system in order to make the first system appear to be compatible with the second system, and wherein the U2C2 gateway is further configured to communicate with a multipoint control unit (MCU) that is configured to manage the UCC session within the first system, wherein the U2C2 gateway is recognized by the MCU as a source and a destination for communications corresponding to the second endpoint in the UCC session; and a mediator configured to receive requests from endpoints in the first system to add endpoints to the UCC session and to send the requests to the U2C2 gateway.

In some embodiments, the second system is one of a plurality of other systems with which the U2C2 gateway is configured to communicate, and wherein the U2C2 gateway is configured with a plurality of modules that enable the U2C2 gateway to communicate with the plurality of systems.

In some embodiments, the mediator is configured to send the request to the U2C2 gateway only if an endpoint to be added to the UCC session is from a system other than the first system, and is configured to send the request to the MCU if an endpoint to be added to the UCC session is from the first system.

In some embodiments, the U2C2 gateway is configured to log into a server in a third system of the plurality of systems as an endpoint of the third system in order to include a third endpoint in the third system in the UCC session.

In some embodiments, the mediator is located on a separate device from the MCU.

In some embodiments, the mediator is located on the MCU.

In still other embodiments, a system, device, or apparatus includes a network interface, a processor coupled to the network interface, and a memory coupled to the processor and containing a plurality of instructions for execution by the processor, wherein the instructions include instructions for executing any of the methods disclosed herein.

What is claimed is:

1. A method for enabling communications between incompatible communication systems, the method comprising:
   receiving, by a universal unified communications and collaboration (U2C2) gateway in a first system, a request originating from a first endpoint in the first system, wherein the request invites a second endpoint in a second system that is incompatible with the first system into a unified communications and collaboration (UCC) session with the first endpoint;
   establishing, by the U2C2 gateway, a connection with a server in the second system in order to communicate with the second endpoint, wherein the U2C2 gateway uses a plurality of protocols and behaviors defined for use by the second system when communicating with the server in order to make the first system appear to be compatible with the second system;
   notifying, by the U2C2 gateway, a multipoint control unit (MCU) within the first system of the connection, wherein the MCU manages the UCC session and wherein the U2C2 gateway is recognized by the MCU as a source and a destination for communications corresponding to the second endpoint in the UCC session;
   normalizing, by the U2C2 gateway, media received from the second endpoint via the server for compatibility with the first system before sending the media to the MCU for the UCC session;
   normalizing, by the U2C2 gateway, media received from the MCU for compatibility with the second system before sending the media to the second endpoint via the server;
   receiving, by the U2C2 gateway, a second request originating from the first endpoint, wherein the second request invites a third endpoint in a third system that is incompatible with the first system and the second system into the UCC session;
   establishing, by the U2C2 gateway, a second connection with a second server in the third system in order to communicate with the third endpoint, wherein the U2C2 gateway uses a plurality of protocols and behaviors defined for use by the third system when communicating with the second server in order to make the first system appear to be compatible with the third system;
   notifying, by the U2C2 gateway, the MCU of the second connection, wherein the U2C2 gateway is recognized by the MCU as both source and destination for communications corresponding to the third endpoint in the UCC session;
   normalizing, by the U2C2 gateway, media received from the third endpoint for compatibility with the first system before sending the media to the MCU for the UCC session; and
   normalizing, by the U2C2 gateway, media received from the MCU for compatibility with the third system before sending the media to the third endpoint.

2. The method of claim 1 wherein the U2C2 gateway is configured to communicate with a plurality of systems outside of the first system, the method further comprising determining, by the U2C2 gateway, which of the plurality of systems contains the second endpoint.

3. The method of claim 2 wherein the U2C2 gateway is configured with a plurality of modules that enable the U2C2 gateway to communicate with the plurality of systems, the method further comprising selecting, by the U2C2 gateway, one of the plurality of modules for communication with the second system.

4. The method of claim 1 wherein the request originating from the first endpoint is received by the U2C2 gateway from a mediator.

5. The method of claim 4 wherein the mediator is located on the MCU.

6. The method of claim 1 wherein the request originating from the first endpoint is received by the U2C2 gateway directly from the first endpoint.

7. The method of claim 1 wherein establishing, by the U2C2 gateway, the connection with the server in the second system includes logging into the server as an endpoint of the second system.

8. A method for enabling communications between incompatible communication systems, the method comprising:
   receiving, by a universal unified communications and collaboration (U2C2) gateway in a first system, a request originating from a first endpoint in the first system, wherein the request invites a second endpoint in a second system that is incompatible with the first system into a unified communications and collaboration (UCC) session with the first endpoint;
   establishing, by the U2C2 gateway, a connection with a server in the second system in order to communicate with the second endpoint, wherein the U2C2 gateway logs into the server as a registered endpoint of the second system in order to be compatible with the second system;
   notifying, by the U2C2 gateway, a multipoint control unit (MCU) within the first system of the connection, wherein the MCU manages the UCC session and wherein the U2C2 gateway is recognized by the MCU as a source and a destination for communications corresponding to the second endpoint in the UCC session;
   normalizing, by the U2C2 gateway, media received from the second endpoint via the server for compatibility with the first system before sending the media to the MCU for the UCC session;
   normalizing, by the U2C2 gateway, media received from the MCU for compatibility with the second system before sending the media to the second endpoint via the server;
   adding a third endpoint in the second system to the UCC session, wherein the U2C2 gateway is recognized by the MCU as the source and destination for communications corresponding to the third endpoint in the UCC session; and
   upon receiving media from the MCU to send to the second system, dropping any of the media that originated in the second system prior to sending any media originating in the first system to the server.

9. The method of claim 8 further comprising:
   adding a third endpoint in the second system to the UCC session, wherein the U2C2 gateway is recognized by the MCU as the source and destination for communications corresponding to the third endpoint in the UCC session; and
   upon receiving media from the MCU to send to the second system, sending the media to the second endpoint only if the media did not originate from the second endpoint, and sending the media to the third endpoint only if the media did not originate from the third endpoint.

10. The method of claim 8 wherein the U2C2 gateway is configured to communicate with a plurality of systems outside of the first system, the method further comprising determining, by the U2C2 gateway, which of the plurality of systems contains the second endpoint.

11. The method of claim 10 wherein the U2C2 gateway is configured with a plurality of modules that enable the U2C2 gateway to communicate with the plurality of systems, the method further comprising selecting, by the U2C2 gateway, one of the plurality of modules for communication with the second system.

12. The method of claim 8 wherein the request originating from the first endpoint is received by the U2C2 gateway from a mediator.

13. The method of claim 8 wherein the request originating from the first endpoint is received by the U2C2 gateway directly from the first endpoint.

14. A first system comprising:
 a universal unified communications and collaboration (U2C2) gateway configured to support a unified communications and collaboration (UCC) session between a first endpoint in the first system and a second endpoint in a second system that is incompatible with the first system, wherein the U2C2 gateway uses a plurality of protocols and behaviors defined for use by the second system when communicating with a server in the second system in order to make the first system appear to be compatible with the second system, and wherein the U2C2 gateway is further configured to communicate with a multipoint control unit (MCU) that is configured to manage the UCC session within the first system, wherein the U2C2 gateway is recognized by the MCU as a source and a destination for communications corresponding to the second endpoint in the UCC session;
 a mediator configured to receive requests from endpoints in the first system to add endpoints to the UCC session and to send the requests to the U2C2 gateway,
 wherein the U2C2 gateway is configured to log into a server in a third system as an endpoint of the third system in order to include a third endpoint in the third system in the UCC session, wherein the U2C2 gateway is recognized by the MCU as the source and destination for communications corresponding to the third endpoint in the UCC session, and wherein the third system is one of a plurality of other systems with which the U2C2 gateway is configured to communicate; and
 wherein the U2C2 gateway is configured to, upon receiving media from the MCU to send to the second system, drop any of the media that originated in the second system prior to sending any media originating in the first system to the server.

15. The system of claim 14 wherein the second system is one of the plurality of other systems with which the U2C2 gateway is configured to communicate, and wherein the U2C2 gateway is configured with a plurality of modules that enable the U2C2 gateway to communicate with the plurality of other systems.

16. The system of claim 15 wherein the mediator is configured to send the request to the U2C2 gateway only if an endpoint to be added to the UCC session is from a system other than the first system, and is configured to send the request to the MCU if an endpoint to be added to the UCC session is from the first system.

17. The system of claim 14 wherein the mediator is located on a separate device from the MCU.

18. The system of claim 14 wherein the mediator is located on the MCU.

\* \* \* \* \*